(12) United States Patent
Ito et al.

(10) Patent No.: US 12,710,584 B2
(45) Date of Patent: Aug. 18, 2026

(54) OPTICAL DEVICE, OPTICAL TRANSMITTER DEVICE, AND OPTICAL RECEIVER DEVICE

(71) Applicant: FUJITSU OPTICAL COMPONENTS LIMITED, Kawasaki (JP)

(72) Inventors: Tatsuya Ito, Yokohama (JP); Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 366 days.

(21) Appl. No.: 18/516,109

(22) Filed: Nov. 21, 2023

(65) Prior Publication Data

US 2024/0230987 A1 Jul. 11, 2024

(30) Foreign Application Priority Data

Jan. 11, 2023 (JP) ................................ 2023-002656

(51) Int. Cl.
*G02B 6/036* (2006.01)
*G02B 6/42* (2006.01)

(52) U.S. Cl.
CPC .......... *G02B 6/036* (2013.01); *G02B 6/4201* (2013.01)

(58) Field of Classification Search
None
See application file for complete search history.

(56) References Cited

U.S. PATENT DOCUMENTS

2016/0124148 A1 5/2016 Matsumoto
2019/0196110 A1* 6/2019 Nakashiba .......... G02B 6/1225

FOREIGN PATENT DOCUMENTS

CN 115132863 B * 11/2024 ............ H10F 71/00
JP H09199791 A * 7/1997
JP 2003-202533 A 7/2003
JP 2016-90711 A 5/2016

* cited by examiner

*Primary Examiner* — Chris H Chu
(74) *Attorney, Agent, or Firm* — STAAS & HALSEY LLP

(57) ABSTRACT

An optical device includes a core formed on a substrate, a cladding layer covering the core, and a passivation layer formed on the cladding layer. The optical device includes a spot size converter that causes an increase in spot size of a light, which is guided through the core, toward end portion of the substrate. The passivation layer has a higher material refractive index than the cladding layer, and is formed in region excluding at least upper portion of the spot size converter.

12 Claims, 22 Drawing Sheets

OPTICAL DEVICE, OPTICAL TRANSMITTER DEVICE, AND OPTICAL RECEIVER DEVICE

CROSS-REFERENCE TO RELATED APPLICATION

This application is based upon and claims the benefit of priority of the prior Japanese Patent Application No. 2023-002656, filed on Jan. 11, 2023, the entire contents of which are incorporated herein by reference.

FIELD

The embodiments discussed herein are related to an optical device, an optical transmitter device, and an optical receiver device.

BACKGROUND

In recent years, accompanying the enhancement in the communication capability, the demand for optical fiber communication has been on the increase. As far as optical fiber communication is concerned, for example, there is a demand for using an optical device that converts electrical signals, which are used in a computer, into optical signals to be passed through an optical fiber. Regarding such optical devices, there is a demand for compact, low-power, and high-capacity optical devices that meet the requirements of the market. In order to achieve that, silicon-photonics (SiPh) elements, in which waveguides and electrode substrates are integrated onto a silicon (Si) substrate, have been drawing a significant amount of interest; and the relevant research is being actively carried out with each passing day. The significant advantage of silicon-photonics (SiPh) is that the high-definition processing technology used in CMOS manufacturing can be put to use, and a large-scale photonics integrated circuit that is configured using a large number of element devices can be manufactured with ease.

In order to implement such a photonics integrated circuit (PIC) as an optical communication module, the silicon (Si) waveguide in the photonics integrated circuit needs to be drawn up to the chip end face; and the input-output of the light needs to be performed by optically connecting the silicon (Si) waveguide and the optical fiber. Thus, as far as the connection between the silicon (Si) waveguide and the optical fiber is concerned, there is a demand for achieving low coupling loss and long-term reliability.

In a SiPh-PIC, either silicon (Si) present in silicon oxide or silicon nitride ($Si_3N_4$) is used as the optical waveguide. However, since silicon dioxide ($SiO_2$) has a large relative refractive index difference, the spot size (modal diameter) of the light to be guided becomes smaller. In that state, if the optical waveguide is jointed to an optical fiber, then the mismatch in the spot size of the light guided through the optical fiber leads to a significant light loss. However, from the perspective of energy efficiency, it is desirable to have low light loss. For that reason, optical coupling is performed using a spot size converter. The known examples of optical coupling include lens coupling in which an optical coupler and an optical fiber are linked via a lens, and butt joint coupling in which an optical coupler and an optical fiber are directly linked to each other via a butt joint.

In the case of using lens coupling, even when the light of the optical coupler of the PIC has a small spot size, the spot size of the light to be guided thorough an optical waveguide can be expanded up to the spot size of an optical fiber, such as a single mode fiber (SMF), using a lens. However, generally, the output-light mode of an optical fiber has polarization dependency and, if a spatial coupling system such as a lens is used, the polarization dependency of the coupling efficiency goes on increasing. Moreover, in the case of building an optical system in which a lens is disposed in between a chip and an optical fiber, the device area increases thereby making it difficult to implement the optical system in a compact module. Furthermore, because of the optical axis adjustment, either the man-hours required in the device manufacturing go up, or it becomes necessary to use a special adjustment device. That affects the cost performance.

On the other hand, in butt-joint coupling, although the issues faced in lens coupling are resolved, increasing the spot size of the output light of a PIC to be comparable to the spot size of the light of a single mode fiber (SMF) having the normal diameter is a difficult task to perform without using a lens.

In that regard, an inverse-tapered SSC structure (SSC stands for Spot Size Converter) is known as one of the structures frequently used in butt-joint coupling. FIG. 28 is a planar schematic view of a substrate-type optical waveguide element 200 that includes an inverse-tapered SSC structure. The substrate-type optical waveguide element 200 illustrated in FIG. 28 includes an optical waveguide 201, an inverse-tapered SSC 202 in which the waveguide to be optically-coupled with the optical waveguide 201 gradually becomes narrower toward a substrate end face E, and a cladding layer 203 that covers the optical waveguide 201 and the SSC 202. In the SSC 202, since the size of the waveguide gradually becomes narrower in a tapered manner, the evanescent waves representing the seepage of the light from the core of the waveguide can be increased, and the light can be widely distributed across the cladding layer 203. As a result, in the SSC 202, the spot size of the light can be increased toward the optical fiber connected to the substrate end face E. That is, in between the substrate-type optical waveguide element 200 and the optical fiber, there is less mismatch in the spot sizes of different optical waveguides, thereby making it possible to achieve a low-loss connection.

However, in order to achieve a low-loss connection between the substrate-type optical waveguide element 200 and an optical fiber, the substrate-type optical waveguide element 200 holds down the light loss at the time of expanding the spot size in the substrate-type optical waveguide element 200. For that, it needs to be ensured that the light spreading in the cladding layer 203 of the substrate-type optical waveguide element 200 does not cause unnecessary light loss.

In the conventional substrate-type optical waveguide element 200, a plurality of semiconductor optical elements, such as a modulator, an optical receiver, and a variable optical attenuator (VOA), is disposed on the substrate. Moreover, in the substrate-type optical waveguide element 200, metals such as aluminum, tungsten, titan, and germanium are used to efficiently transmit electricity to those semiconductor optical elements. However, since such metals undergo water corrosion and go on having an increased resistance due to oxidation, the characteristics of the optical elements undergo a decline. Hence, it becomes necessary to ensure long-term reliability. Thus, from the perspective of long-term reliability, it is common practice to add a passivation layer in the upper portion of the substrate-type optical waveguide element 200, so that the fluctuation in the material properties attributed to moisture absorption is held down and long-term reliability is ensured.

FIG. 29 is a substantially cross-sectional schematic view illustrating an example of a conventional substrate-type optical waveguide element 210. The substrate-type optical waveguide element 210 illustrated in FIG. 29 includes a silicon (Si) substrate 211, a buried oxide (BOX) layer 212 that is laminated on the silicon (Si) substrate 211, and a cladding layer 213 that is laminated on the buried oxide (BOX) layer 212. Moreover, the substrate-type optical waveguide element 210 includes an optical waveguide 214 disposed inside the cladding layer 213, and a passivation layer 215 that is laminated on the cladding layer 213. The buried oxide (BOX) layer 212 represents, for example, a lower cladding made of silicon dioxide ($SiO_2$). The cladding layer 213 represents, for example, an upper cladding made of silicon dioxide ($SiO_2$). The optical waveguide 214 represents, for example, an optical waveguide made of silicon nitride ($Si_3N_4$). Herein, some part of the silicon dioxide ($SiO_2$) layer laminated on the buried oxide (BOX) layer 212 is etched to some part of the silicon nitride ($Si_3N_4$) layer laminated on the silicon dioxide ($SiO_2$) layer, so that the core of the silicon nitride ($Si_3N_4$) layer is formed. Moreover, in order to ensure that the core does not remain exposed, silicon dioxide ($SiO_2$) is deposited onto the silicon dioxide ($SiO_2$) layer and onto the post-etching silicon nitride ($Si_3N_4$) layer. As a result, the optical waveguide 214 is formed in the cladding layer 213.

The optical waveguide 214 includes a linear waveguide 221 and an SSC 222 that gradually becomes narrower toward the substrate end face E. The passivation layer 215 is formed by depositing, for example, a silicon nitride ($Si_3N_4$) film on the cladding layer 213.

[Patent Literature 1] Japanese Laid-open Patent Publication No. 2003-202533

[Patent Literature 2] Japanese Laid-open Patent Publication No. 2016-090711

The material refractive index of silicon nitride ($Si_3N_4$) in the passivation layer 215 is higher than the material refractive index of silicon dioxide ($SiO_2$) in the cladding layer 213. For example, if the light to be guided is assumed to have the wavelength of 1.55 μm, then silicon nitride ($Si_3N_4$) has the material refractive index of about 2.0 and silicon dioxide ($SiO_2$) has the material refractive index of about 1.44. Thus, upon conducting a test, it became clear that, when the light spreading in the SSC 222 gets distributed in the passivation layer 215, optical confinement due to total internal reflection is not achieved and there is transition of light to the passivation layer 215. That leads to an increase in the light loss in the SSC 222.

FIG. 30 is a substantially cross-sectional schematic view illustrating an example of the substrate-type optical waveguide element 210 to be tested. FIG. 31 is a planar schematic view illustrating an example of the SSC 222 in the substrate-type optical waveguide element 210 to be tested. In the substrate-type optical waveguide element 210 illustrated in FIG. 30, it is assumed that the buried oxide (BOX) layer 212 has the thickness of 3.0 μm, the cladding layer 213 has the thickness of 2.89 μm, and the passivation layer 215 has the thickness of 0.3 μm. Moreover, the substrate-type optical waveguide element 210 has a cross-section structure in which, during the process of generating the cladding layer 213, the optical waveguide 214 made of silicon nitride ($Si_3N_4$) has the core formed with the thickness of 0.3 μm at the height of 0.49 μm from the buried oxide (BOX) layer 212. As illustrated in FIG. 31, the SSC 222 made of silicon nitride ($Si_3N_4$) is assumed to be an inverse-tapered SSC in which the waveguide is expanded up to 1.0 μm with the leading end portion having a width $W_{SIN}$ of 0.34 μm, and in which the tapered shape has the total length of 200 μm. Moreover, the SSC 222 is assumed to be connected to an optical fiber having the spot size diameter of 4 μm. Herein, the spot size diameter indicates the diameter in the case in which the distance from the core center to the position at which the magnitude of the electric field is equal to 1/e-th of the peak represents the radius.

To the SSC 222 in the substrate-type optical waveguide element 210, lights were input in modes TE0 and TM0; the power of the output lights was measured in the modes TE0 and TM0; and the light loss in each mode was measured from the ratio of the input power with respect to the output power. Herein, the mode TE0 represents the guided mode having the highest effective refractive index from among the TE modes in which major components are horizontal to the substrate. The mode TM0 represents the guided mode having the highest effective refractive index from among the TM modes in which major components are perpendicular to the substrate.

FIG. 32 is an explanatory diagram illustrating an example of the measurement result of the light loss for each input wavelength in the modes TE0 and TM0 of the SSC 222 illustrated in FIG. 31. When the measurement result illustrated in FIG. 32 is verified, it becomes clear that the light loss is low for each input wavelength in the case of the TE0 mode and the light loss is high for each input wavelength in the case of the TM0 mode.

FIG. 33 is an explanatory diagram illustrating an example of the electric field distribution of the mode TM0 of the SSC 222 illustrated in FIG. 31. In order to confirm the cause for the light loss, the optical electric field distribution of the mode TM0, which is guided in the cross-sectional surface of the SSC 222, was calculated according to the finite element method. As illustrated in FIG. 33, it can be confirmed that, although the electric field is concentrated at the core of the SSC 222, the electric field has seeped into the cladding layer 213 and the spot size has expanded because of the narrow waveguide width. Moreover, it can be seen that the spread electric field reaches the passivation layer 215 and gets distributed in the passivation layer 215 too. As a result, the light that is originally supposed to spread from the center of the core makes transition to the passivation layer 215, thereby resulting in an increase in the light loss.

Accordingly, in the substrate-type optical waveguide element 210 illustrated in FIG. 31, is a difficult task to ensure long-term reliability and at the same time reduce the loss during spot size conversion. Meanwhile, the silicon dioxide ($SiO_2$) layer of the cladding layer 213 can be increased in thickness so as to keep the passivation layer 215 away from the core of the SSC 222. However, as the cladding layer 213 becomes thicker, the stress becomes more intense thereby likely causing manufacturing problems such as warping of the photonics integrated circuit wafer that includes the substrate-type optical waveguide element 210. Hence, the fact remains that there is a limit to increase the thickness of the cladding layer 213.

SUMMARY

According to an aspect of an embodiment, an optical device includes a core formed on a substrate, a cladding layer covering the core, and a passivation layer formed on the cladding layer. The optical device includes a spot size converter that causes an increase in spot size of a light, which is guided through the core, toward end portion of the substrate. The passivation layer has a higher material refractive index than the cladding layer, and is formed in region excluding at least upper portion of the spot size converter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. However, the disclosed technology is not limited by the embodiments described below. Moreover, the embodiments described below can be appropriately combined without causing any contradiction.

(a) First Embodiment

Figure 1:
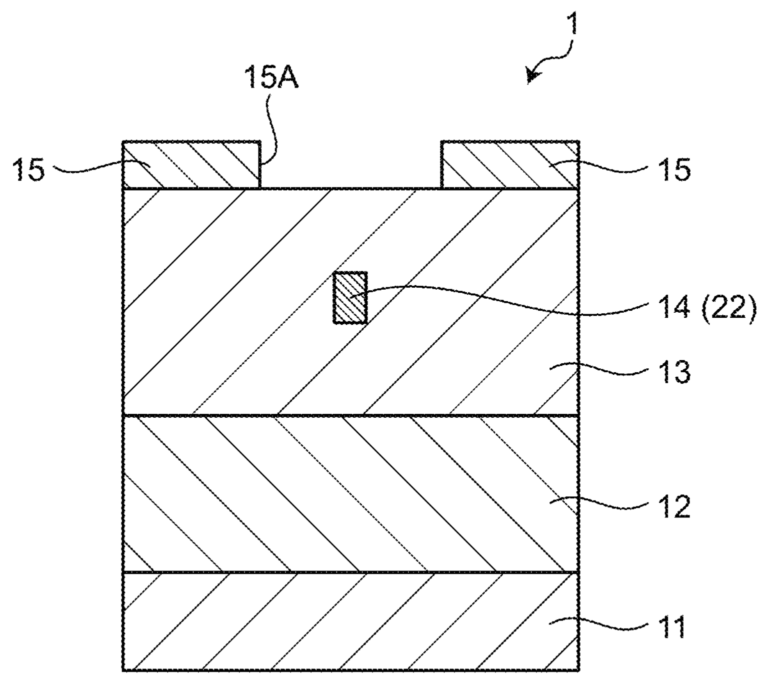
FIG. 1 is a substantially cross-sectional schematic view illustrating an example of a substrate-type optical waveguide element according to a first embodiment.
Figure 2:
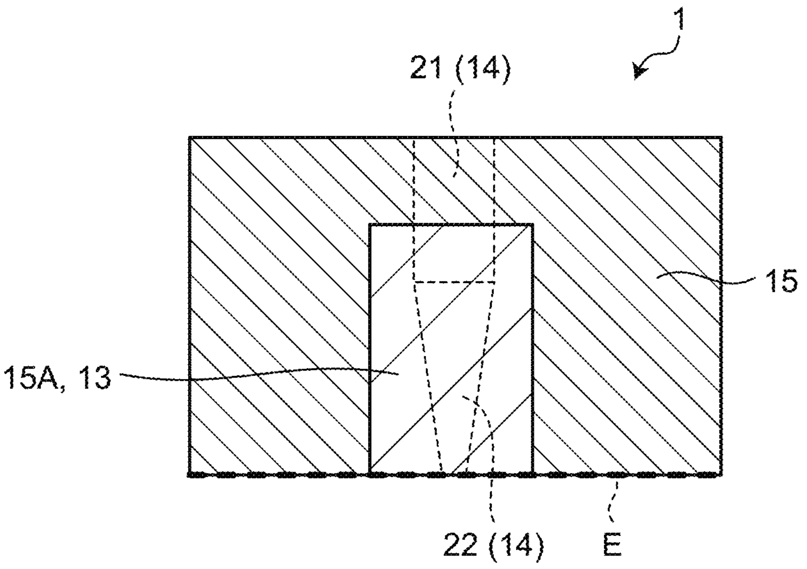
FIG. 2 is a substantial planar schematic view illustrating an example of the substrate-type optical waveguide element.

FIG. 1 is a substantially cross-sectional schematic view illustrating an example of a substrate-type optical waveguide element 1 according to a first embodiment. FIG. 2 is a substantial planar schematic view illustrating an example of the substrate-type optical waveguide element 1. The substrate-type optical waveguide element 1 illustrated in FIG. 1 includes a silicon (Si) substrate 11, a buried oxide (BOX) layer 12 that is laminated on the silicon (Si) substrate 11, a cladding layer 13 that is laminated on the buried oxide (BOX) layer 12, and an optical waveguide 14 that is disposed in the cladding layer 13. Moreover, the substrate-type optical waveguide element 1 includes a passivation layer 15 that is laminated on the cladding layer 13. The buried oxide (BOX) layer 12 represents, for example, a lower cladding made of silicon dioxide ($SiO_2$). The cladding layer 13 represents, for example, an upper cladding made of silicon dioxide ($SiO_2$). The optical waveguide 14 represents, for example, an optical waveguide made of silicon nitride ($Si_3N_4$). Herein, some part of the silicon dioxide ($SiO_2$) layer laminated on the buried oxide (BOX) layer 12 is etched to some part of the silicon nitride ($Si_3N_4$) layer laminated on the silicon dioxide ($SiO_2$) layer, and the core of the silicon nitride ($Si_3N_4$) layer is formed. Moreover, in order to ensure that the core does not remain exposed, silicon dioxide ($SiO_2$) is deposited onto the silicon dioxide ($SiO_2$) layer and onto the post-etching silicon nitride ($Si_3N_4$) layer. As a result, the optical waveguide 14 is formed in the cladding layer 213. The optical waveguide 14 illustrated in FIG. 2 includes a linear waveguide 21 and an SSC 22 that is optically coupled with an optical fiber and that gradually becomes narrower toward the substrate end face E of the substrate-type optical waveguide element 1.

The linear waveguide 21 is, for example, an optical waveguide in which the core is made of a silicon nitride ($Si_3N_4$) layer. The SSC 22 is disposed in between the linear waveguide 21 and the substrate end face E, and has an inverse-tapered structure in which the core width gradually becomes narrower toward the substrate end face E and the spot size of the light guided through the core gradually becomes larger toward the substrate end face E.

The passivation layer 15 can be formed by depositing, for example, a silicon nitride ($Si_3N_4$) film on the cladding layer 13. On account of being formed using a silicon nitride ($Si_3N_4$) layer, the passivation layer 15 has a higher material refractive index than the cladding layer 13. Moreover, since the passivation layer 15 is formed in the region excluding at least the upper portion of the SSC 22, an opening 15A is formed through which the cladding layer 13 present in the upper portion of the SSC 22 gets exposed.

Figure 3:
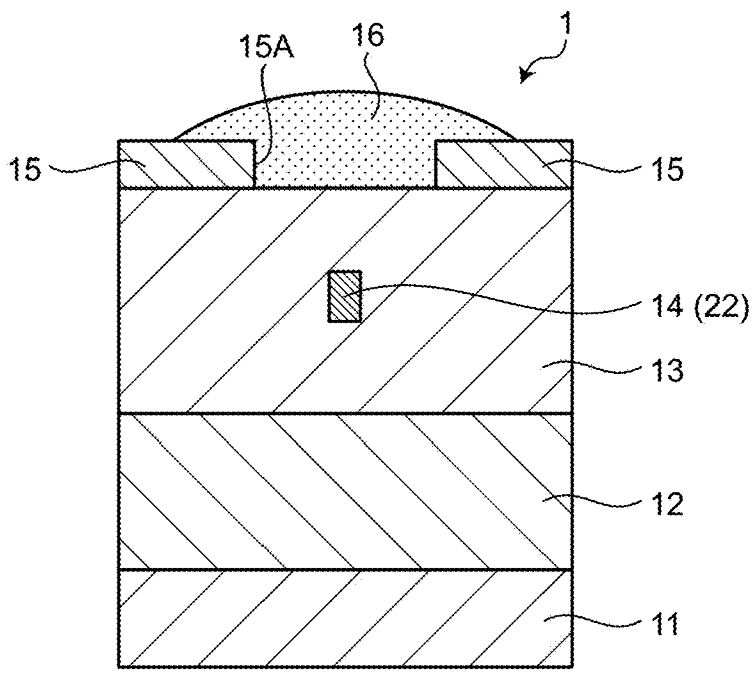
FIG. 3 is a substantially cross-sectional schematic view of the substrate-type optical waveguide element after an adhesive agent has been applied.

FIG. 3 is a substantially cross-sectional schematic view of the substrate-type optical waveguide element 1 after an adhesive agent has been applied. With reference to FIG. 3, on the cladding layer 13 that is exposed from the opening 15A formed on the passivation layer 15, an adhesive agent 16 having a lower material refractive index than the cladding layer 13 is applied, and the core of the SSC 22 in the substrate end face E and the core of an optical fiber are optically-coupled using the adhesive agent 16.

Figure 4:
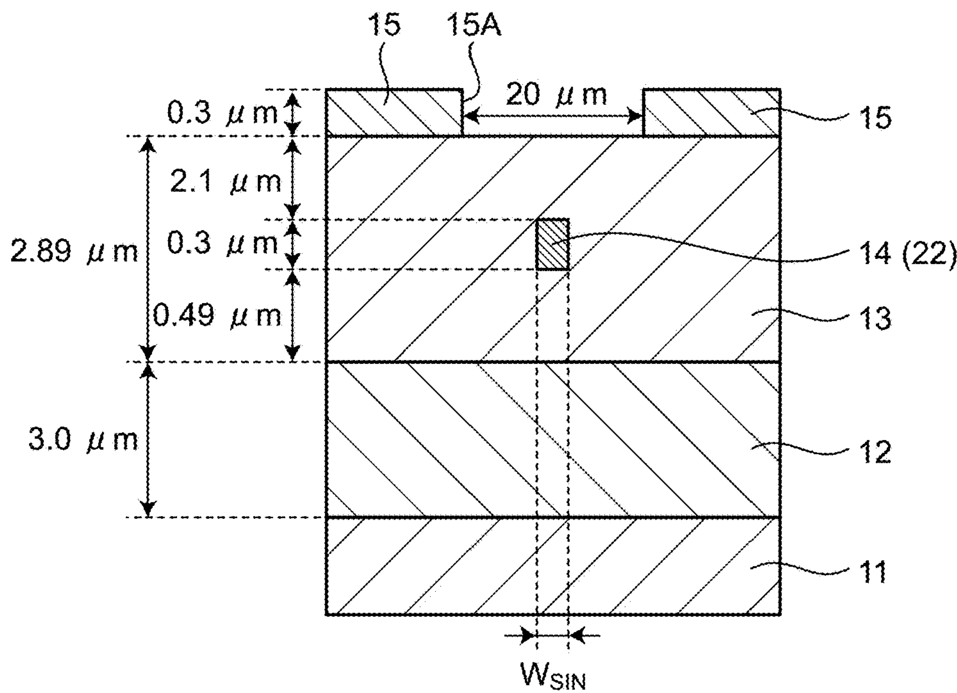
FIG. 4 is a substantially cross-sectional schematic view of an example of the substrate-type optical waveguide element to be tested.

Given below is the explanation about testing the performance of the substrate-type optical waveguide element 1 according to the first embodiment. FIG. 4 is a substantially cross-sectional schematic view of an example of the substrate-type optical waveguide element 1 to be tested. In the substrate-type optical waveguide element 1 illustrated in FIG. 4, it is assumed that the buried oxide (BOX) layer 12 has the thickness of 3.0 μm, the cladding layer 13 has the thickness of 2.89 μm, and the passivation layer 15 has the thickness of 0.3 μm. Moreover, the substrate-type optical waveguide element 210 has a cross-section structure in which, during the process of generating the cladding layer 13, the optical waveguide 14 made of silicon nitride ($Si_3N_4$) has the core formed with the thickness of 0.3 μm at the height of 0.49 μm from the buried oxide (BOX) layer 12. The SSC 22 in the optical waveguide 14 is assumed to be an inverse-tapered SSC in which the waveguide is gradually expanded up to 1.0 μm with the leading end portion having the width $W_{SIN}$ of 0.34 μm, and in which the tapered shape has the total length of 200 μm. Moreover, the SSC 22 is assumed to be connected to an optical fiber having the spot size diameter of 4 μm. Meanwhile, the opening 15A formed on the passivation layer 15 is assumed to have the width of, for example, 20 μm. Regarding the opening 15A formed on the passivation layer 15 in the SSC 22, after a silicon nitride ($Si_3N_4$) film is deposited on the passivation layer 15, the opening 15A is formed by performing lithography or etching.

Figure 5:
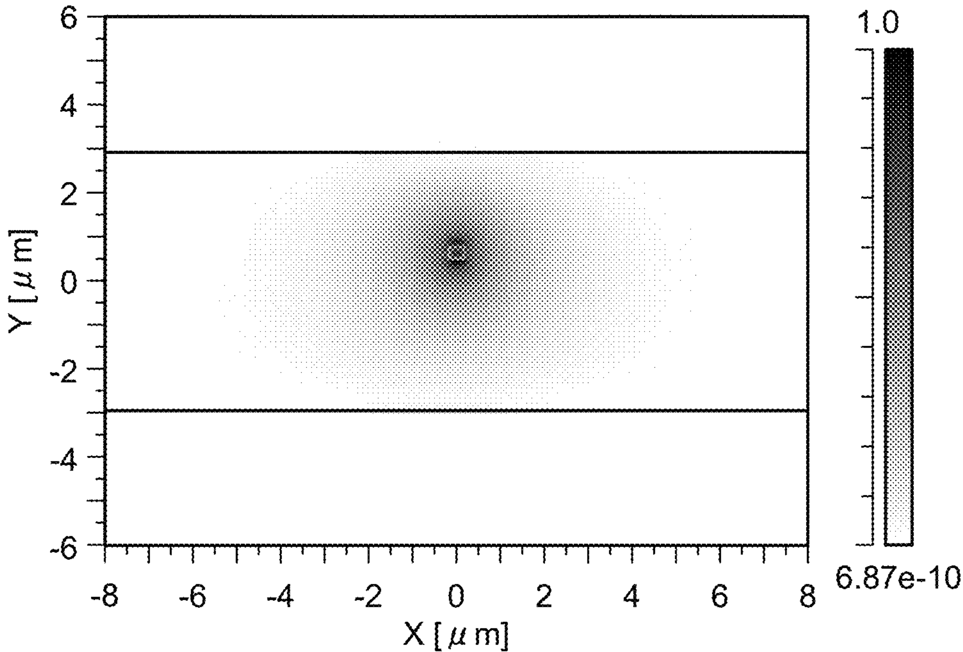
FIG. 5 is an explanatory diagram illustrating an example of the electric field distribution of a mode TM0 of a spot size converter (SSC) illustrated in FIG. 4.
Figure 33:
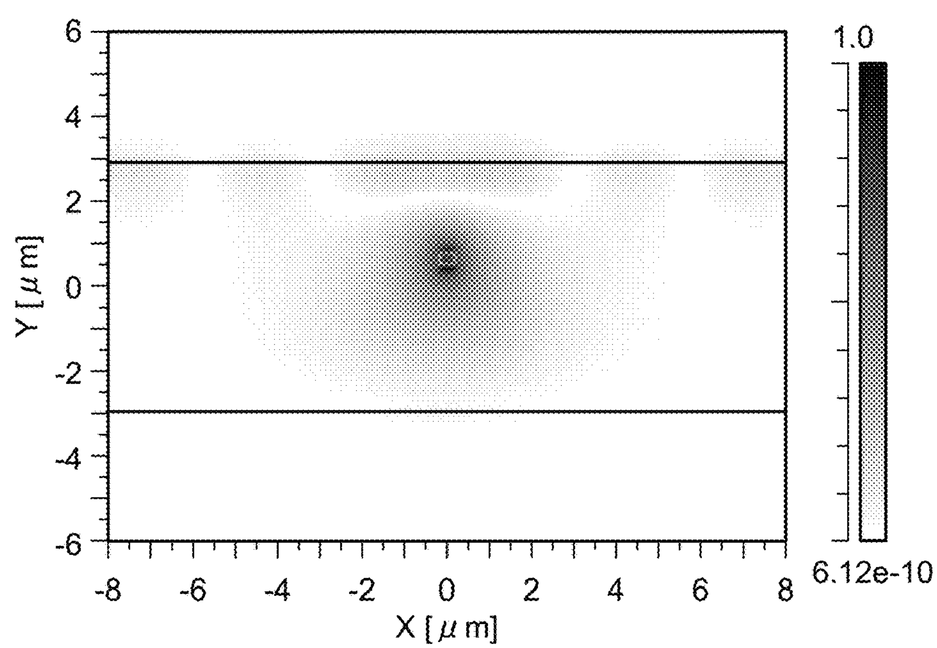
FIG. 33 is an explanatory diagram illustrating an example of the electric field distribution of the mode TM0 of the SSC illustrated in FIG. 31.

FIG. 5 is an explanatory diagram illustrating an example of the electric field distribution of the mode TM0 of the SSC 22 illustrated in FIG. 4. In the case in which the passivation layer 15 is removed from the SSC 22, the optical electric field distribution of the mode TM0, which is guided in the cross-sectional surface of the SSC 22, was calculated according to the finite element method. Herein, it can be seen that, with respect to the substrate, the electric field components of the mode TM0 spread around the core and, as compared to FIG. 33, the electric field components of the mode TM0 that spread in the vicinity of the passivation layer 215 are absent in FIG. 5. That is, as a result of removing the passivation layer 15 from the SSC 22, it becomes possible to reduce the light loss attributed to the transition of light from the core of the SSC 22 to the passivation layer 15.

Figure 6:
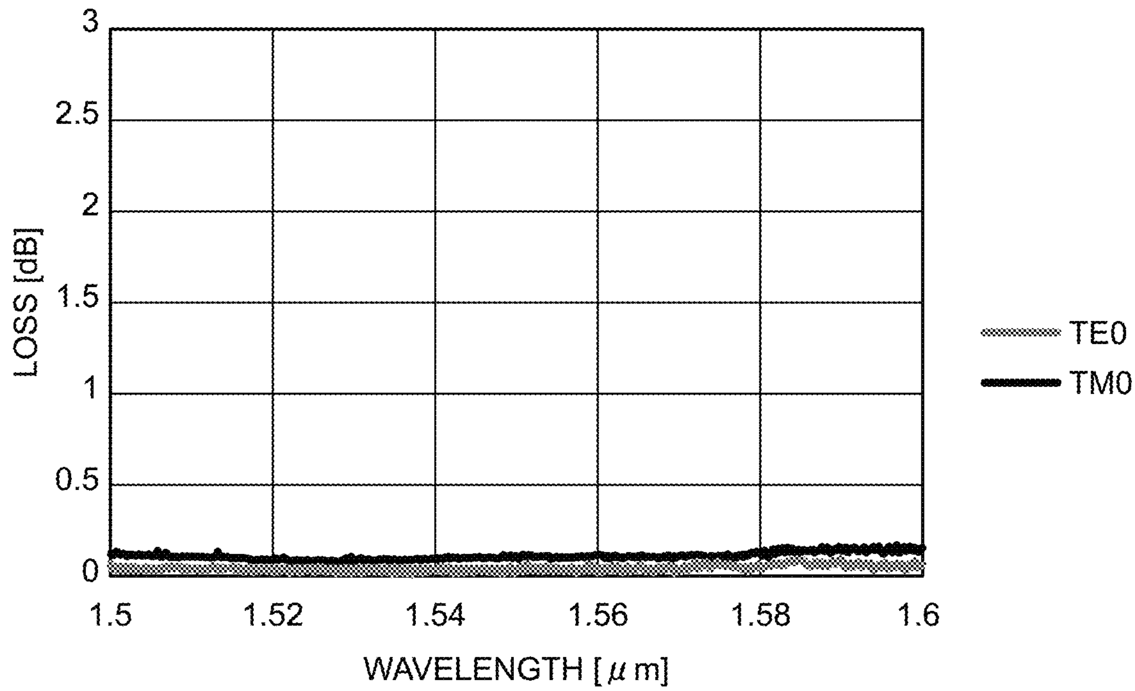
FIG. 6 is an explanatory diagram illustrating an example of the measurement result of the light loss for each input wavelength in modes TE0 and TM0 of the SSC illustrated in FIG. 4.

FIG. 6 is an explanatory diagram illustrating an example of the measurement result of the light loss for each input wavelength in the modes TE0 and TM0 of the SSC 22 illustrated in FIG. 4. When the measurement result illustrated in FIG. 6 is verified, it can be seen that, as a result of removing the passivation layer 15 from the upper portion of the SSC 22, not only the light loss remains low for each input wavelength in the case of the TE0 mode, but the light loss becomes lower also for each input wavelength in the case of the TM0 mode.

Given below is the explanation about testing the impact on the long-term reliability due to the removal of the passivation layer 15 from the SSC 22, that is, due to the formation of the opening 15A. Regarding the formation of the cladding layer 13 using silicon dioxide ($SiO_2$), for example, a film deposition method based on plasma chemical vapor deposition (plasma CVD) is known. In the film deposition method based on plasma CVD, an organic silicon material is broken down into O—H radicals using plasma, and is deposited as silicon dioxide ($SiO_2$) on the target. However, there are times when the organic silicon material gets left behind in the film in the form of O—H radicals. In that case, due to the effect of absorption of the moisture from outside, the O—H radicals change to silicon dioxide ($SiO_2$)

with time. That leads to changes in the optical properties. For example, the material refractive index happens to change.

In that regard, in the SSC 22 illustrated in FIG. 4, the impact on the optical properties was tested in the case in which the material refractive index of the cladding layer 13, which is made of silicon dioxide ($SiO_2$), has changed. The change in the material refractive index indicates a decline in the connection efficiency of the optical fiber due to the change in the spot size diameter of the substrate-type optical waveguide element 1. In the SSC 22, the spot size expands due to the seepage of the light in the cladding layer 13. However, when the refractive index of the cladding layer 13 changes, the extent of seepage changes thereby resulting in a change in the spot size diameter. In that regard, the connection efficiency was calculated between the light that has sufficiently spread at the substrate end face E, which represents the output face of the SSC 22, of the substrate-type optical waveguide element 1 and the light at the core of the optical fiber.

Figure 7:
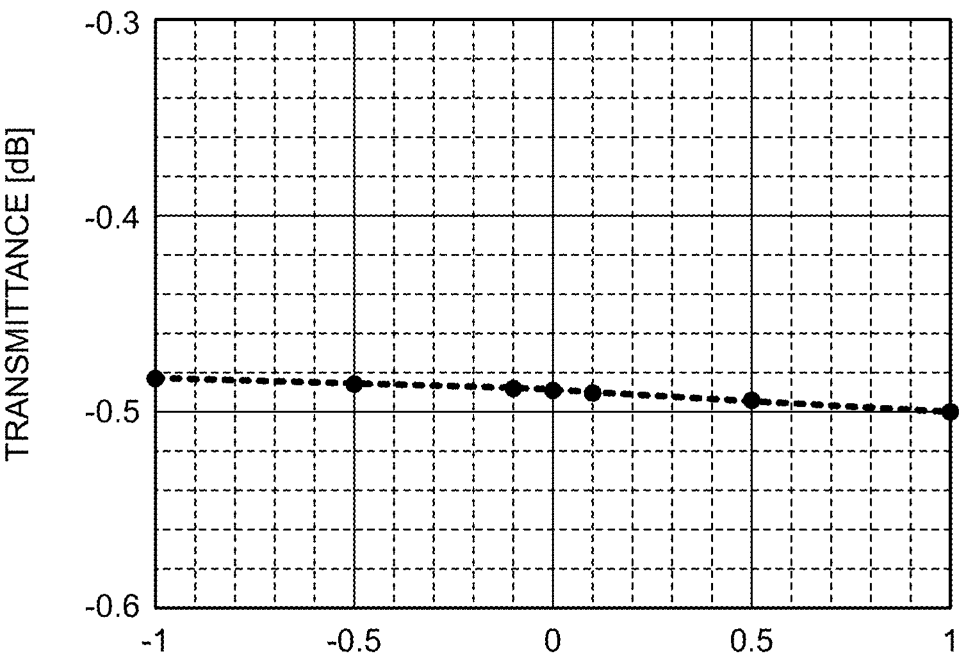
FIG. 7 is an explanatory diagram illustrating an example of the impact of the transmittance accompanying a change in the refractive index of a cladding layer of the substrate-type optical waveguide element.

More particularly, the finite element method was implemented and, in the case in which the increase rate of the material refractive index of the cladding layer 13 changes in the range from −1% to +1% in the substrate-type optical waveguide element 1, the connection efficiency was calculated with respect to an optical fiber having the spot size diameter of 4 μm. Meanwhile, it is popularly known that the range of change in the refractive index does not exceed the range from −1% to +1%. Moreover, by taking into account the actual installation accuracy, the distance between the optical fiber and the output end of the SSC 22 is assumed to be equal to 3 μm, and the light guided through the core of the SSC 22 is assumed to have the wavelength of 1.5475 μm. FIG. 7 is an explanatory diagram illustrating an example of the impact of the transmittance accompanying a change in the refractive index of the cladding layer 13 of the substrate-type optical waveguide element 1. The transmittance represents the efficiency at which the light output by the SSC 22 is input to the optical fiber. Even when the increase rate of the material refractive index of the cladding layer 13 changes in the range from −1% to +1%, the transmittance changes only in the range from −0.011 dB to 0.007 dB, that is, from 99.974% to 100.016% with respect to the pre-change transmittance. Thus, it can be seen that, even if the passivation layer 15 is removed from the SSC 22, that is, even if the opening 15A is formed on the passivation layer 15, the change in the transmittance of the cladding layer 13 is minor and the long-term reliability can be ensured. That is, in the substrate-type optical waveguide element 1, it becomes possible to reduce the light loss of the SSC 22 as well as to ensure the long-term reliability.

Figure 8A:
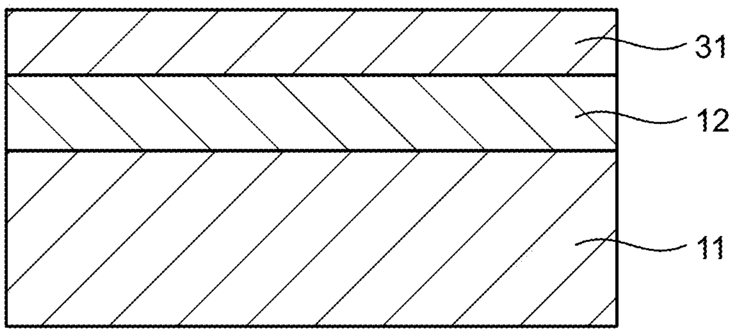
FIG. 8A is an explanatory diagram illustrating an example of an SOI substrate (SOI stands for Silicon on Insulator) used in the substrate-type optical waveguide element.

Given below is the explanation about the manufacturing process of the substrate-type optical waveguide element 1 according to the first embodiment. FIG. 8A is an explanatory diagram illustrating an example of an SOI substrate (SOI stands for Silicon on Insulator) used in the substrate-type optical waveguide element 1. The SOI substrate illustrated in FIG. 8A includes the silicon (Si) substrate 11, the buried oxide (BOX) layer 12 that is laminated on the silicon (Si) substrate 11, and a silicon (Si) layer 31 that is laminated on the buried oxide (BOX) layer 12. The silicon (Si) substrate 11 has the thickness of, for example, 750 μm; the buried oxide (BOX) layer 12 has the thickness of, for example, 2.5 μm; and the silicon (Si) layer (SOI layer) 31 has the thickness of, for example, 250 μm. Regarding the wafer of the substrate-type optical waveguide element 1, for example, apart from the present structure, there are structures in which the processes such as doping are required in the modulator or the optical receiver. However, herein, it is assumed that such processes are skipped.

Figure 8B:
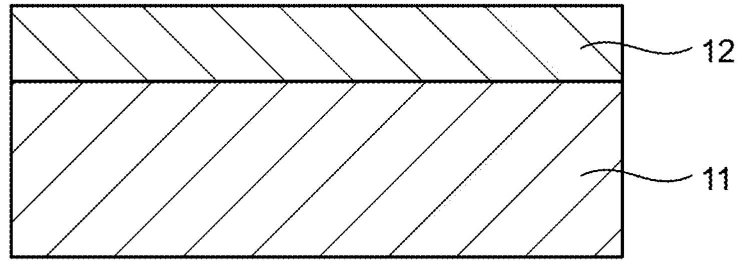
FIG. 8B is an explanatory diagram for explaining an example of the SOI substrate after the removal of a silicon (Si) layer.

FIG. 8B is an explanatory diagram for explaining an example of the SOI substrate after the removal of the silicon (Si) layer. In the SOI substrate illustrated in FIG. 8B, on account of not being used in the core, the Silicon (Si) layer 31 on the SOI substrate illustrated in FIG. 8A is removed by performing etching.

Figure 9A:
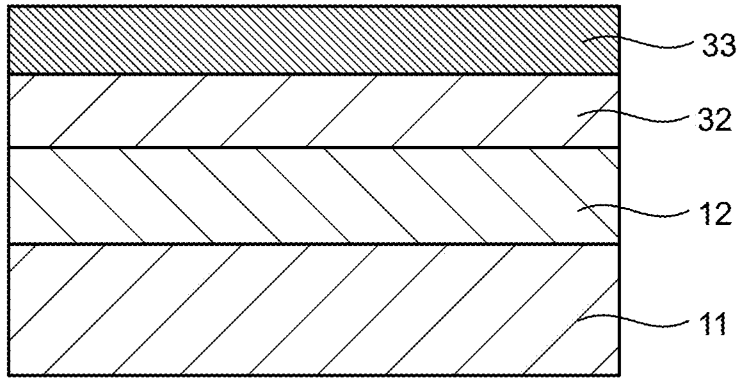
FIG. 9A is an explanatory diagram illustrating an example of the SOI substrate after a film formation process is performed.

FIG. 9A is an explanatory diagram illustrating an example of the SOI substrate after a film formation process is performed. Using the plasma CVD method, a silicon dioxide ($SiO_2$) layer 32 is formed on the buried oxide (BOX) layer 12, and a silicon nitride ($Si_3N_4$) layer 33 of the optical waveguide 14 is formed on the silicon dioxide ($SiO_2$) layer 32. That is, the SOI substrate illustrated in FIG. 9A includes the silicon dioxide ($SiO_2$) layer 32 that is laminated on the buried oxide (BOX) layer 12, and includes the silicon nitride ($Si_3N_4$) layer 33 that is laminated on the silicon dioxide ($SiO_2$) layer 32.

Figure 9B:
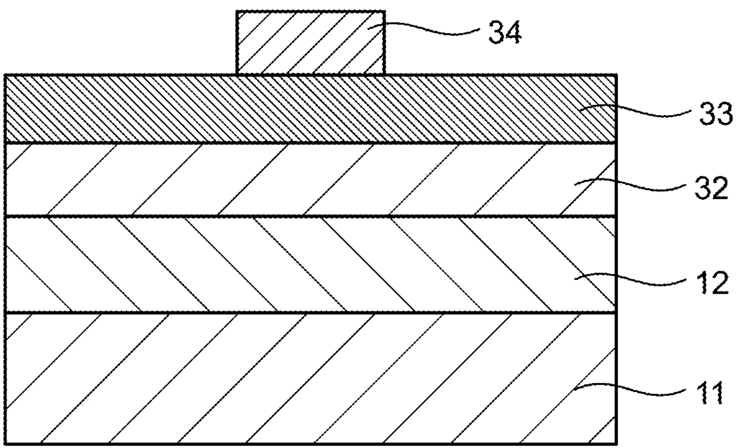
FIG. 9B is an explanatory diagram for explaining an example of a masking process of an optical waveguide.

FIG. 9B is an explanatory diagram for explaining an example of a masking process of the optical waveguide 14. On the silicon nitride ($Si_3N_4$) layer 33 illustrated in FIG. 9B, a photoresist 34 is disposed at the position of formation of the core of the optical waveguide 14 made of silicon nitride ($Si_3N_4$).

Figure 10A:
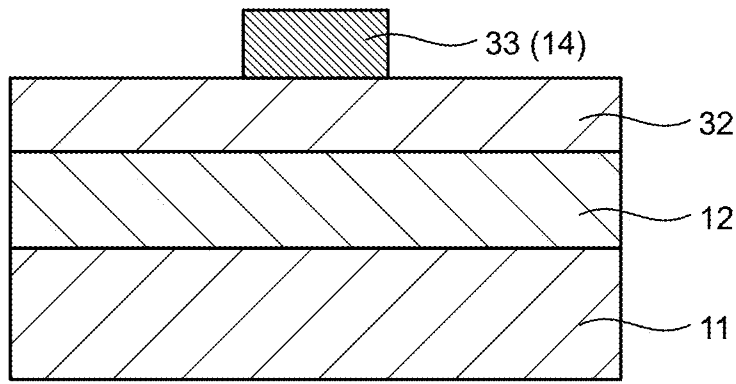
FIG. 10A is an explanatory diagram illustrating an example of a formation process of the optical waveguide.
Figure 10B:
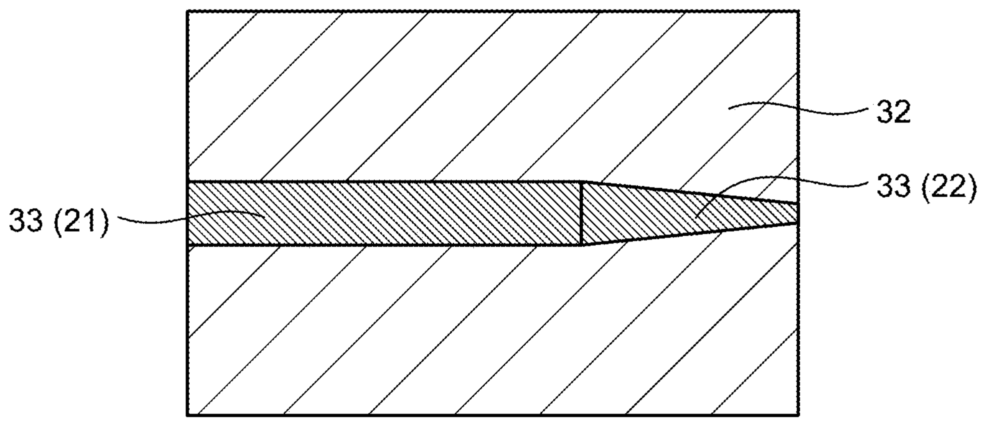
FIG. 10B is a substantially planar schematic view illustrating an example of the SOI substrate after the formation process of the optical waveguide is performed.

FIG. 10A is an explanatory diagram illustrating an example of a formation process of the optical waveguide 14, and FIG. 10B is a substantially planar schematic view illustrating an example of the SOI substrate after the formation process of the optical waveguide 14 is performed. In the optical waveguide 14 that is formed on the silicon dioxide ($SiO_2$) layer 32 as illustrated in FIG. 10B, the linear waveguide 21 has the waveguide width as, for example, a pattern of 1000 nm. In the optical waveguide 14, the inverse-tapered SSC 22 is, for example, a pattern having the total length of 250 μm in which the waveguide width is gradually varied from 1000 nm to 340 nm toward the substrate end face E. When pattern masking of the linear waveguide 21 and the SSC 22 is performed and is followed by dry etching, the pattern of the linear waveguide 21 made of silicon nitride ($Si_3N_4$) and the pattern of the SSC 22 made of silicon nitride ($Si_3N_4$) are formed on the silicon dioxide ($SiO_2$) layer 32.

Figure 11A:
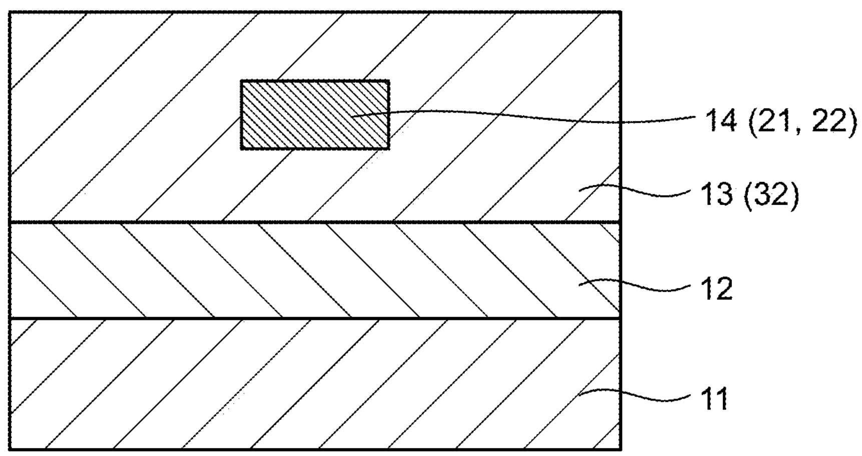
FIG. 11A is an explanatory diagram illustrating an example of a formation process of the cladding layer.

FIG. 11A is an explanatory diagram illustrating an example of a formation process of the cladding layer 13. As a result of implementing the plasma CVD method and forming a silicon dioxide ($SiO_2$) film on the silicon dioxide ($SiO_2$) layer 32 of the SOI substrate illustrated in FIG. 10A, on the linear waveguide 21, and on the SSC 22; the cladding layer 13 is formed on the buried oxide (BOX) layer 12. The cladding layer 13 covers and encloses the linear waveguide 21 and the SSC 22. The cladding layer 13 is assumed to have the thickness of, for example, 5 μm. As a result, the cores of the linear waveguide 21 and the SSC 22, which are made of silicon nitride ($Si_3N_4$), get enclosed by the cladding layer 13 that is made of silicon dioxide ($SiO_2$); and, due to the relative refractive index difference between silicon nitride ($Si_3N_4$) and silicon dioxide ($Si_2$), the light inside the cores gets confined for propagation.

Figure 11B:
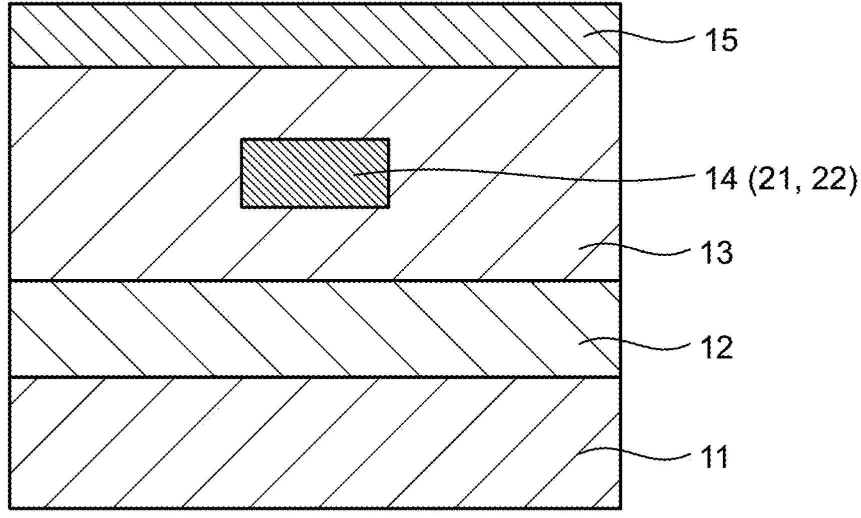
FIG. 11B is an explanatory diagram illustrating an example of a formation process of a passivation layer.

FIG. 11B is an explanatory diagram illustrating an example of a formation process of the passivation layer 15. On the cladding layer 13, a silicon nitride ($Si_3N_4$) film is formed according to the plasma CVD method, and the passivation layer 15 is formed on the cladding layer 13. The passivation layer 15 is assumed to have the thickness of, for example, 300 nm.

Figure 12A:
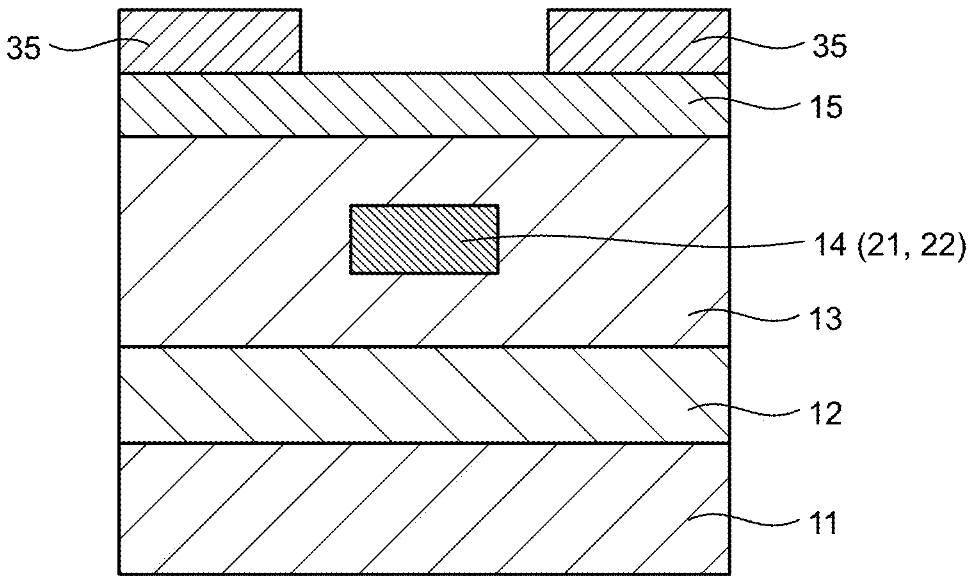
FIG. 12A is an explanatory diagram illustrating an example of a masking process of the passivation layer.

FIG. 12A is an explanatory diagram illustrating an example of a masking process of the passivation layer 15. In order to remove the passivation layer 15 from the upper portion of the SSC 22, that is, in order to form the opening 15A, a photoresist 35 is disposed on the passivation layer 15 in the portion excluding the upper portion of the SSC 22.

Figure 12B:
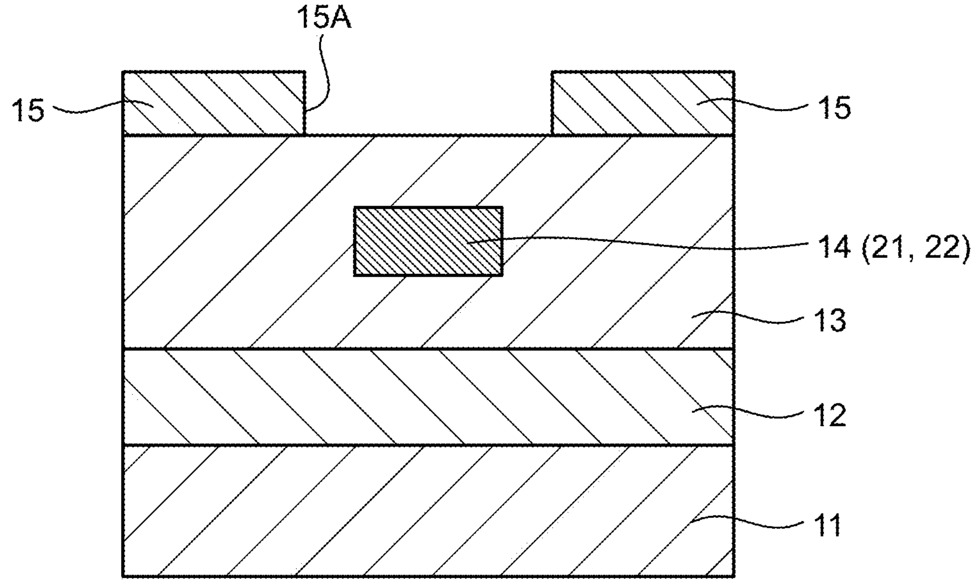
FIG. 12B is an explanatory diagram illustrating an example of a formation process of an opening.

FIG. 12B is an explanatory diagram illustrating an example of a formation process of the opening 15A. As a result of performing etching of the passivation layer 15 on which the photoresist 35 is disposed as illustrated in FIG. 12A, the passivation layer 15 gets removed from the upper portion of the SSC 22. As a result, the opening 15A is formed in the passivation layer 15 of the SSC 22. The opening 15A has the width in the range of, for example, 20 μm. As a result of carrying out such processes, the substrate-type optical waveguide element 1 illustrated in FIG. 4 is formed.

Figure 13A:
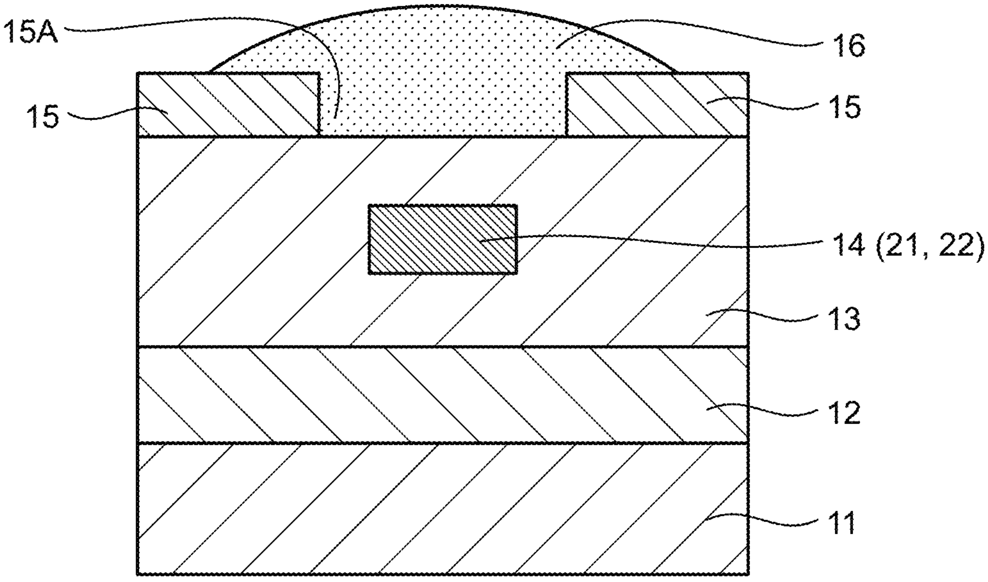
FIG. 13A is an explanatory diagram illustrating an example of the substrate-type optical waveguide element during an adhesive agent application process in the state in which the SSC and an optical fiber have been jointed.
Figure 13B:
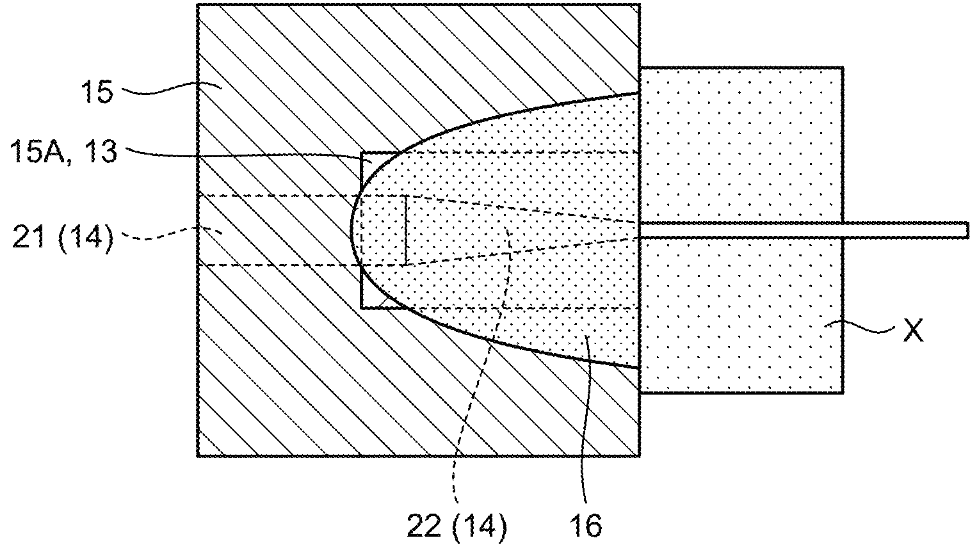
FIG. 13B is a substantially planar schematic view illustrating an example of the substrate-type optical waveguide element after the adhesive agent application process is performed.

FIG. 13A is an explanatory diagram illustrating an example of the substrate-type optical waveguide element 1 during an adhesive agent application process in the state in which the SSC 22 and an optical fiber X have been jointed. FIG. 13B is a substantially planar schematic view illustrating an example of the substrate-type optical waveguide element 1 after the adhesive agent application process is performed. The leading end of the SSC 22 at the substrate end face E of the substrate-type optical waveguide element 1 is connected to the optical fiber X, and the adhesive agent 16 is applied onto the cladding layer 13 that is exposed from the opening 15A in the passivation layer 15. The adhesive agent 16 has a lower material refractive index than the cladding layer 13. When the cladding layer 13 has the refractive index of, for example, 1.44; the adhesive agent 16 is assumed to have the refractive index of, for example, 1.41. Thus, using the adhesive agent 16 applied in the opening 15A on the passivation layer 15 in the upper portion of the SSC 22, the optical fiber X is connected to the SSC 22 at the substrate end face E. Meanwhile, the optical fiber X is, for example, a capillary optical fiber in which, as a structure for stabilizing the connection with the substrate-type optical waveguide element 1; for example, a capillary representing a small glass block is attached around the core.

In the substrate-type optical waveguide element 1 according to the first embodiment, the passivation layer 15 is formed in the region excluding the upper region of the SSC 22 made of silicon nitride ($Si_3N_4$). As a result, it becomes possible to reduce the light loss attributed to the transition of light from the core of the SSC 22 to the passivation layer 15, and to ensure long-term reliability attributed to the passivation layer 15.

Meanwhile, regarding the size of the core of the SSC 22, either the thickness of the core can be varied along the direction of travel of the light, or the width of the core can be varied. The width of the core can be easily varied by performing lithography and etching. Meanwhile, it is assumed that, in the substrate-type optical waveguide element 1, the core of the optical waveguide 14 is made of silicon nitride ($Si_3N_4$), the cladding layer 13 is made of silicon dioxide ($SiO_2$), and the passivation layer 15 is made of silicon nitride ($Si_3N_4$). However, that is not the only possible case, and it is possible to change the materials. Moreover, the buried oxide (BOX) layer 12 and the cladding layer 13 can be made of mutually different materials. Furthermore, in the substrate-type optical waveguide element 1, as long as the passivation layer 15 has a higher refractive index than the cladding layer 13, it is possible to use some other material. Meanwhile, the optical fiber X is treated as the connection destination for the substrate-type optical waveguide element 1. However, that is not the only possible case. Alternatively, for example, lens coupling or butt joint coupling with another substrate-type optical waveguide element can also be considered. Moreover, if the spot size is to be expanded in the SSC 22, then any type of connection destination can be considered. In that portion of the cladding layer 13 from which the passivation layer 15 is removed, a silicon dioxide ($SiO_2$) film can be further deposited or a material such as resin can be further applied. At that time, the material to be added is set to have either a comparable material refractive index to the cladding layer 13 or a lower material refractive index than the cladding layer 13. As a result of adding such materials, the refractive index of the added space approaches the material refractive index of the cladding layer 13 as compared to the case of an air layer (having the material refractive index of "1"). Higher the material refractive index difference, the more it becomes possible to hold down the seepage of the light in the cladding layer 13, and hence the expansion of the spot size becomes smaller. However, as a result of adding a new material, the seepage of the light in the added space increases, and the spot size can be expanded more as compared to the case of the air layer. As a result, the adjustment of spot size expansion can be done with flexibility.

Meanwhile, as the optical waveguide 14, a channel waveguide is used because of strong optical confinement that enables achieving compactness of the device. However, that is not the only possible case. Alternatively, for example, instead of using a channel waveguide, it is possible to use, for example, a rib waveguide, a ridge waveguide, or a high-mesa waveguide. When a rib waveguide is used as the optical waveguide 14, the light seeps also in the slab portion of the rib waveguide. Hence, the impact of the sidewall roughness of the core is not easily felt, and it becomes possible to achieve low-loss propagation.

Regarding the opening 15A formed on the passivation layer 15, as long as its scope includes some part of the cladding layer 13 representing the upper portion of the core of the SSC 22, it serves the purpose. The electric field spreads centered around the core of the SSC 22. However, with respect to the direction perpendicular to the substrate, as compared to the electric field intensity at the same height, that is, at the height at which the passivation layer 15 is placed, the electric field in the upper portion of the core becomes dominant. Thus, by removing the passivation layer 15 from that upper portion, it becomes possible to achieve the effects according to the application concerned. If the passivation layer 15 is removed over a wider range, then the transition of the electric field of the non-dominant portion to the passivation layer 15 is held down, thereby making it possible to further reduce the light loss.

In the first embodiment, when "d" represents the spot size at the distance between the lower portion of the passivation layer 15 and the center of the core of the SSC 22, as long as a value smaller than 1.5 d is set, it is possible to achieve the effects of the application concerned. Generally, the electric field distribution of the optical waveguide 14 is close to the Gaussian distribution, and is set within a range in which the spot size becomes equal to 1/e from the magnitude peak of the electric field. That is, when "d" represents the spot size, from the center of the core of the optical waveguide 14 to the upper portion thereof, d/2 represents the distance at which the electric field becomes equal to 1/e. The electric field separated from the core center by 1.5 d has the magnitude of about 1/e^3. If that magnitude is converted into the intensity that is proportional to the energy, then the magnitude of about 1/e^6=0.0025 is achieved. At that time, at a particular position on the passivation layer 15 that is separated from 1.5*d*, the intensity becomes equal to about 0.25% and is sufficiently ignorable. Thus, when the passivation layer 15 is lower than 1.5 d, it becomes possible to achieve the effects according to the application concerned that are attributed to the fact that the passivation layer 15 is removed from the upper portion of the core of the SSC 22.

Meanwhile, after a resist is disposed on the position of formation of the opening 15A on the cladding layer 13 and after a silicon nitride ($Si_3N_4$) film is formed on the passivation layer 15, the resist can be removed and the opening 15A can be formed on the passivation layer 15. Meanwhile, as long as the passivation layer 15 is not formed in the upper portion of the SSC 22, the explanation is not limited to the methods given above.

In the first embodiment, the explanation is given about an example in which the material of the core of the optical waveguide 14 is made of, for example, silicon nitride ($Si_3N_4$). However, the core material is not limited to that example. Alternatively, as long as the core material includes silicon (Si), silicon mononitride (SiN), or silicon oxynitride (SiON); it serves the purpose. In that regard, for example, an embodiment about the case in which silicon (Si) is used as the material of the core of the optical waveguide is described below as a second embodiment. In the following explanation, the identical configurations to the substrate-type optical waveguide element 1 according to the first embodiment are referred to by the same reference numerals, and the same configurations and the same operations are not explained again.

(b) Second Embodiment

Figure 14:
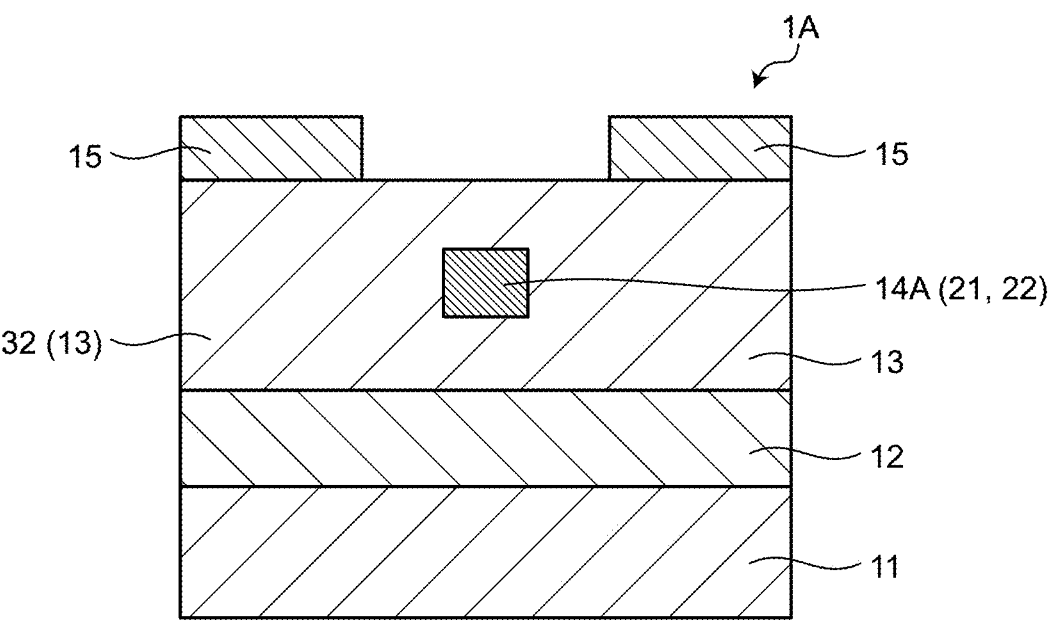
FIG. 14 is a substantially cross-sectional schematic view of a substrate-type optical waveguide element according to a second embodiment.

FIG. 14 is a substantially cross-sectional schematic view of a substrate-type optical waveguide element 1A according to the second embodiment. As compared to the substrate-type optical waveguide element 1 according to the first embodiment, the substrate-type optical waveguide element 1A according to the second embodiment differs in the way that an optical waveguide 14A is included in which silicon (Si) is used in place of silicon nitride ($Si_3N_4$) as the material of the core of the linear waveguide 21 and the SSC 22.

Given below is the explanation of a manufacturing process of the substrate-type optical waveguide element 1A according to the second embodiment. After the silicon dioxide ($SiO_2$) layer 32 is formed on the buried oxide (BOX) layer 12 according to the plasma CVD method, the silicon (Si) layer of the optical waveguide 14A is formed on the silicon dioxide ($SiO_2$) layer 32. That is, the SOI substrate includes the silicon (Si) substrate 11, the buried oxide (BOX) layer 12, the silicon dioxide ($SiO_2$) layer 32 that is laminated on the buried oxide (BOX) layer 12, and a silicon (Si) layer that is laminated on the silicon dioxide ($SiO_2$) layer 32. On the silicon (Si) layer, a photoresist is disposed at the position of formation of the core of the optical waveguide 14A made of silicon (Si). After placing the photoresist, dry etching is performed, and the pattern of the optical waveguide 14A, which includes the linear waveguide 21 made of silicon (Si) and the SSC 22 made of silicon (Si), on the silicon dioxide ($SiO_2$) layer 32.

As a result of implementing the plasma CVD method and forming a silicon dioxide ($SiO_2$) film on the silicon dioxide ($SiO_2$) layer 32 of the SOI substrate, on the linear waveguide 21, and on the SSC 22; the cladding layer 13 is formed on the buried oxide (BOX) layer 12. The cladding layer 13 covers and encloses the optical waveguide 14A that includes the linear waveguide 21 and the SSC 22. The cladding layer 13 is assumed to have the thickness of, for example, 5 μm.

As a result, the silicon (Si) cores of the linear waveguide 21 and the SSC 22 get enclosed by the cladding layer 13 made of silicon dioxide ($SiO_2$) and, due to the relative refractive index difference between silicon (Si) and silicon dioxide ($SiO_2$), the light inside the cores gets confined for propagation. Meanwhile, the SSC 22 is, for example, a structure having the total length of 180 μm in which the waveguide width is varied from 460 nm to 140 nm.

Then, the passivation layer 15 is formed on the cladding layer 13. Subsequently, the passivation layer 15 is removed from the SSC 22, which is made of silicon (Si), and the opening 15A is formed in the passivation layer 15. As a result, the substrate-type optical waveguide element 1A illustrated in FIG. 14 is formed.

In the substrate-type optical waveguide element 1A according to the second embodiment, the passivation layer 15 is formed in the region excluding the upper portion of the SSC 22 made of silicon (Si). As a result, it becomes possible to reduce the light loss attributed to the transition of light from the core of the SSC 22, which is made of silicon (Si), to the passivation layer 15, and to ensure long-term reliability attributed to the passivation layer 15.

Figure 15:
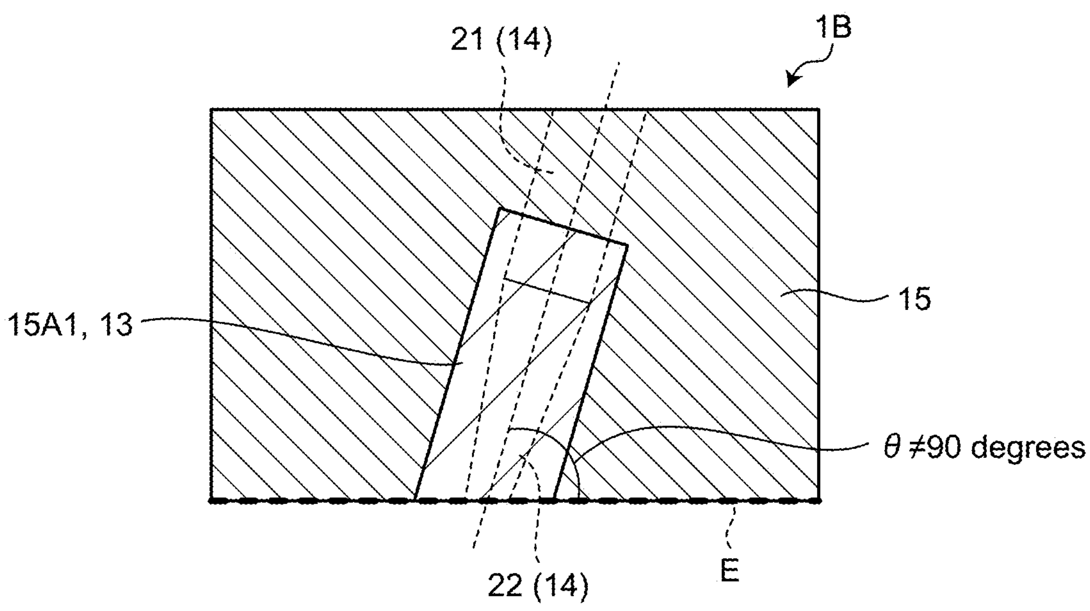
FIG. 15 is a substantially planar schematic view illustrating an example of a substrate-type optical waveguide element according to a third embodiment.

Meanwhile, for explanatory convenience, in the substrate-type optical waveguide element 1 according to the first embodiment, the explanation is given about the structure in which the SSC 22 and the substrate end face E make a right angle with each other. However, the angle between the SSC 22 and the substrate end face E need not be a right angle. An embodiment about that case is described below as a third embodiment. FIG. 15 is a substantially planar schematic view illustrating an example of a substrate-type optical waveguide element 1B according to the third embodiment. In the following explanation, the identical configurations to the substrate-type optical waveguide element 1 according to the first embodiment are referred to by the same reference numerals, and the same configurations and the same operations are not explained again.

(c) Third Embodiment

In the substrate-type optical waveguide element 1B illustrated in FIG. 15, when viewed from the top face, the substrate end face E and the SSC 22 make an angle other than 90°, such as an angle of 80°. Moreover, in the substrate-type optical waveguide element 1B, the passivation layer 15 is removed from the upper portion of the SSC 22 and an opening 15A1 is formed. The opening 15A1 makes an angle of 80° with the substrate end face E.

Figure 16A:
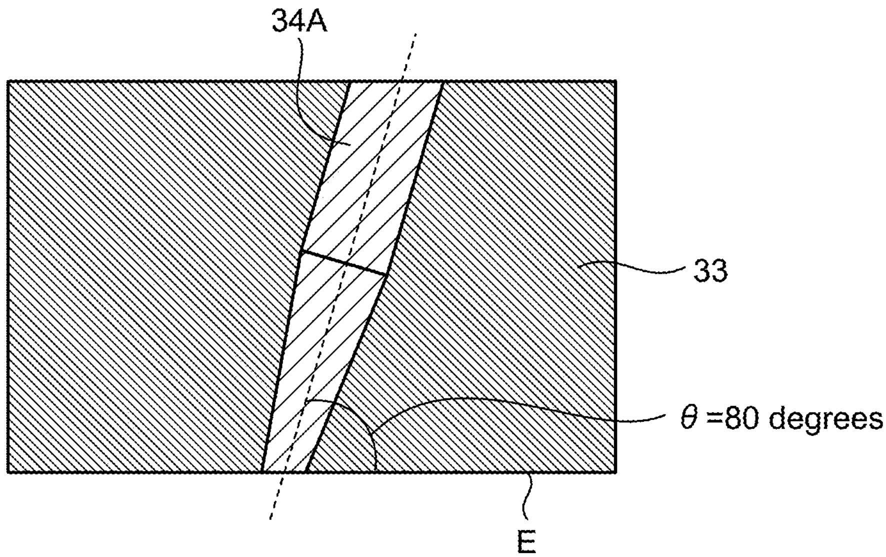
FIG. 16A is an explanatory diagram illustrating an example of a masking process of the optical waveguide.

Given below is the explanation of a manufacturing process of the substrate-type optical waveguide element 1B according to the third embodiment. FIG. 16A is an explanatory diagram illustrating an example of a masking process of the optical waveguide 14. On the silicon nitride ($Si_3N_4$) layer 33 illustrated in FIG. 16A, a photoresist 34A is disposed in such a way that the pattern of the SSC 22 is formed with the angle between the substrate end face E and the SSC 22 being equal to 80°. Then, the photoresist 34A is dry-etched on the silicon nitride ($Si_3N_4$) layer 33, so that the SSC 22 is formed on the buried oxide (BOX) layer 12 to make an angle of 80° with the substrate end face E.

Figure 16B:
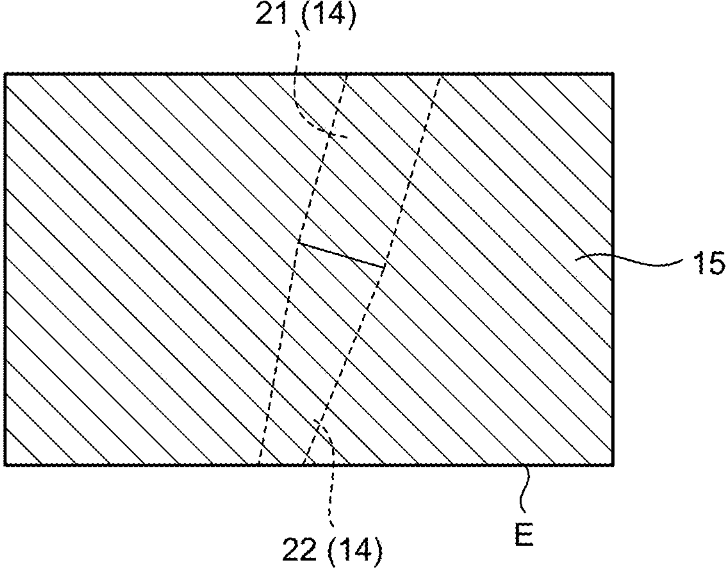
FIG. 16B is an explanatory diagram illustrating an example of a film formation process.

FIG. 16B is an explanatory diagram illustrating an example of a film formation process. Herein, a silicon dioxide ($SiO_2$) layer is formed on the buried oxide (BOX) layer 12 and the SSC 22 according to the plasma CVD method, so that the cladding layer 13 is formed on the buried oxide (BOX) layer 12 and the SSC 22. Moreover, a silicon nitride ($Si_3N_4$) layer is formed on the cladding layer 13 according to the plasma CVD method, so that the passivation layer 15 is formed on the cladding layer 13.

Figure 17:
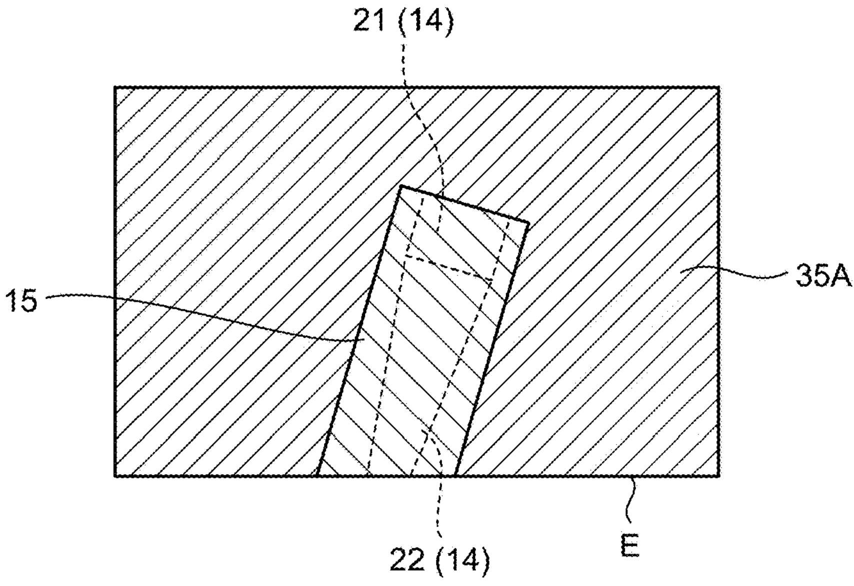
FIG. 17 is an explanatory diagram illustrating an example of a masking process of the passivation layer.

FIG. 17 is an explanatory diagram illustrating an example of a masking process of the passivation layer 15. In order to remove the passivation layer 15 from the upper portion of the SSC 22, a photoresist 35A is disposed on the passivation layer 15 in the portion excluding the upper portion of the SSC 22, and dry etching is performed. Thus, as illustrated in FIG. 15, the substrate-type optical waveguide element 1B is formed in which the passivation layer 15 is removed from the upper portion of the SSC 22, which makes an angle of 80° with the substrate end face E.

In the substrate-type optical waveguide element 1B according to the third embodiment, the passivation layer 15 is removed from the upper portion of the SSC 22, which makes an angle other than a right angle with the substrate end face E. As a result, also in the case in which a connection is established with an optical fiber that is not perpendicular with respect to the substrate end face E, it becomes possible to reduce the light loss attributed to the transition of light from the core of the SSC 22 to the passivation layer 15, and to ensure long-term reliability attributed to the passivation layer 15.

Meanwhile, an embodiment about a photonics integrated circuit wafer that includes a pair of substrate-type optical waveguide elements 1 according to the first embodiment is described below as a fourth embodiment. In the following explanation, the identical configurations to the substrate-type optical waveguide element 1 according to the first embodiment are referred to by the same reference numerals, and the same configurations and the same operations are not explained again.

(d) Fourth Embodiment

Figure 18:
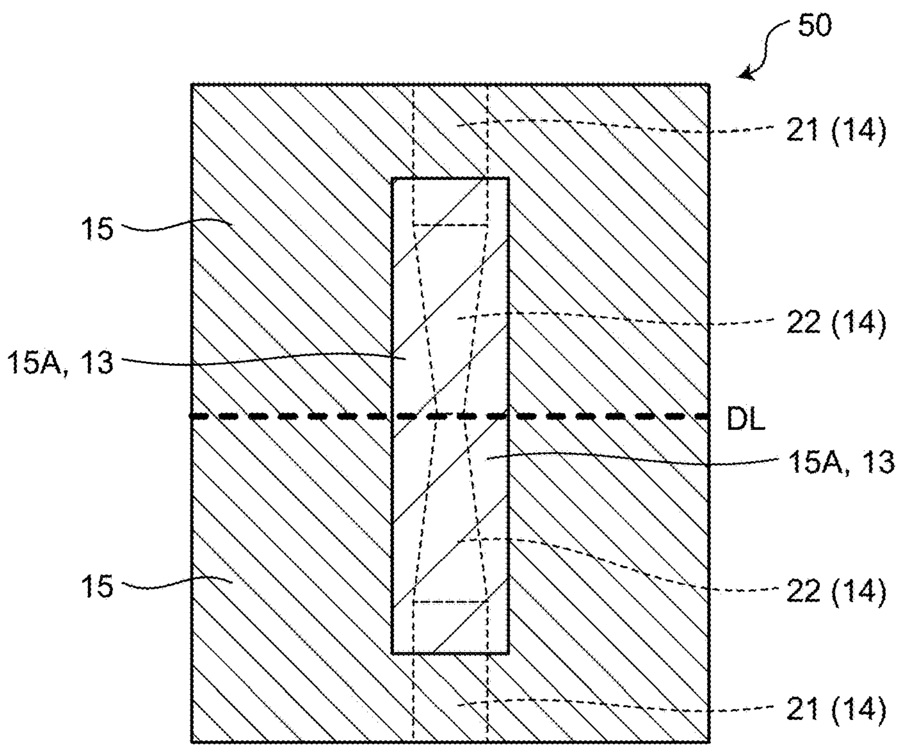
FIG. 18 is a planar schematic view illustrating an example of a photonics integrated circuit wafer according to a fourth embodiment.

FIG. 18 is a planar schematic view illustrating an example of a photonics integrated circuit wafer 50 according to the fourth embodiment. In the photonics integrated circuit wafer 50 illustrated in FIG. 18, a pair of substrate-type optical waveguide elements 1 are connected in series and across a dicing line DL. Thus, in the photonics integrated circuit wafer 50, the leading end of the SSC 22 in one substrate-type optical waveguide element 1 is linked to the leading end of the SSC 22 in the other substrate-type optical waveguide element 1; and, in that state, dicing is performed along the dicing line. As a result, from the photonics integrated circuit wafer 50, the two substrate-type optical waveguide elements 1 can be separated.

Figure 19:
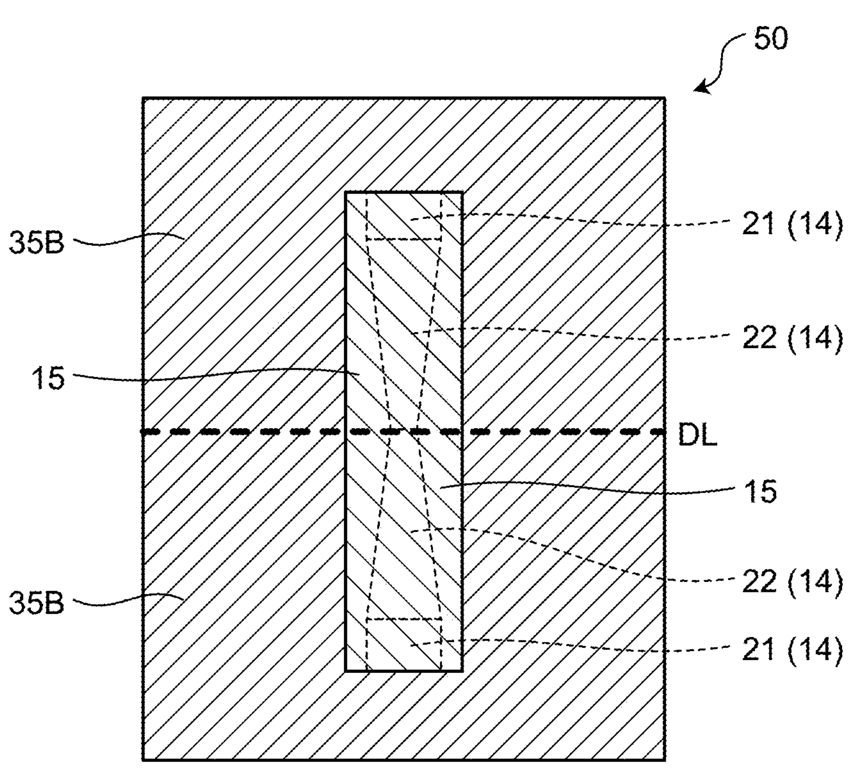
FIG. 19 is an explanatory diagram illustrating an example of a masking process of the passivation layer in the photonics integrated circuit wafer.

FIG. 19 is an explanatory diagram illustrating an example of a masking process of the passivation layer 15 in the photonics integrated circuit wafer 50. The photonics integrated circuit wafer 50 includes the silicon (Si) substrate 11, the buried oxide (BOX) layer 12 that is laminated on the silicon (Si) substrate 11, the cladding layer 13 that is laminated on the buried oxide (BOX) layer 12, the optical waveguide 14 present in the cladding layer 13, and the passivation layer 15 that is laminated on the cladding layer 13. Moreover, a photoresist 35B is disposed on the passivation layer 15 in the portion excluding the upper portion of the SSC 22 of each optical waveguide 14. Then, dry etching is performed with respect to the photonics integrated circuit wafer 50 in which the photoresists 35B are placed, and the opening 15A is formed on each passivation layer 15 in the photonics integrated circuit wafer 50. Thus, as a result of forming a pair of openings 15A in the pair of substrate-type optical waveguide elements 1, the photonics integrated circuit wafer 50 is formed as illustrated in FIG. 18.

In the photonics integrated circuit wafer 50 according to the fourth embodiment, the pair of substrate-type optical waveguide elements 1 are connected in series and across the dicing line DL. Thus, by dicing along the dicing line DL, the two substrate-type optical waveguide elements 1 can be clipped.

In the photonics integrated circuit wafer 50 according to the fourth embodiment, although a single pair of substrate-type optical waveguide elements 1 are disposed in series, it is alternatively possible to have a photonics integrated circuit wafer in which a plurality of substrate-type optical waveguide elements 1 is disposed in parallel. An embodiment about that case is described below as a fifth embodiment. In the following explanation, the identical configurations to the substrate-type optical waveguide element 1 according to the first embodiment are referred to by the same reference numerals, and the same configurations and the same operations are not explained again.

(e) Fifth Embodiment

Figure 20:
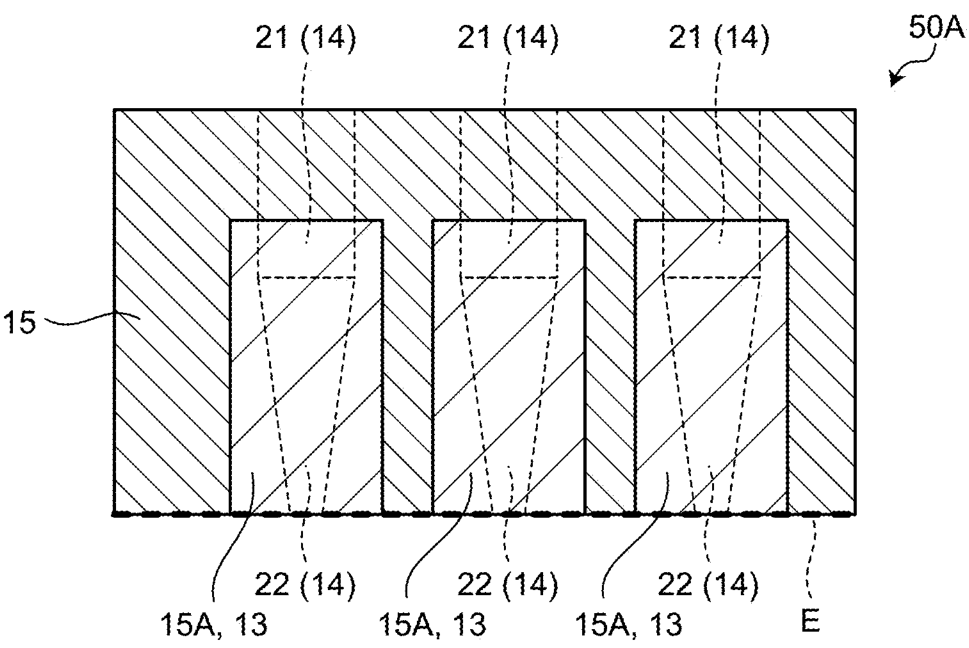
FIG. 20 is a planar schematic view illustrating an example of a photonics integrated circuit wafer according to a fifth embodiment.

FIG. 20 is a planar schematic view illustrating an example of a photonics integrated circuit wafer 50A according to the fifth embodiment. The photonics integrated circuit wafer 50A illustrated in FIG. 20 includes a plurality of substrate-type optical waveguide elements 1, such as three substrate-type optical waveguide elements 1, arranged in parallel.

Figure 21:
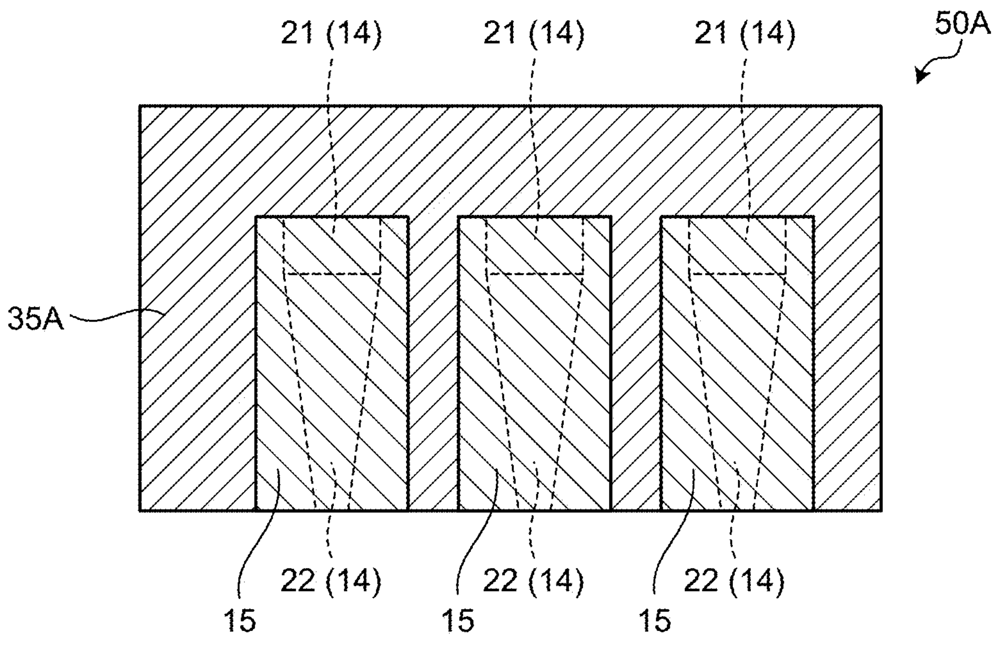
FIG. 21 is an explanatory diagram illustrating an example of a masking process of the passivation layer in the photonics integrated circuit wafer.

FIG. 21 is an explanatory diagram illustrating an example of a masking process of the passivation layer 15 in the photonics integrated circuit wafer 50A. The photonics integrated circuit wafer 50A includes the silicon (Si) substrate 11, the buried oxide (BOX) layer 12 that is laminated on the silicon (Si) substrate 11, the cladding layer 13 that is laminated on the buried oxide (BOX) layer 12, the optical waveguides 14 present in the cladding layer 13, and the passivation layer 15 that is laminated on the cladding layer 13. Moreover, the photoresist 35A is disposed on the passivation layers 15 formed in the region excluding the upper portion of the SSCs 22 in the three optical waveguides 14. Then, dry etching is performed with respect to the photonics integrated circuit wafer 50A in which the photoresist 35A is placed, and the openings 15A are formed on the passivation layers 15 in the photonics integrated circuit wafer 50A. Thus, as a result of forming three openings 15A in three substrate-type optical waveguide elements 1, the photonics integrated circuit wafer 50A is formed as illustrated in FIG. 20.

In the photonics integrated circuit wafer 50A according to the fifth embodiment, since three substrate-type optical waveguide elements 1 are arranged in parallel, it becomes possible to perform optical coupling with an optical fiber array including three cores.

Meanwhile, in the substrate-type optical waveguide element 1 (1A, 1B) according to the first to fifth embodiments, the surrounding of the SSC 22 in the optical waveguide 14 is covered by the cladding layer 13. However, as an embodiment about a substrate-type optical waveguide element that includes a hollow optical waveguide including an air layer with a cavity formed around the SSC 22, a sixth embodiment is described below. In the following explanation, the identical configurations to the substrate-type optical waveguide element 1 according to the first embodiment are referred to by the same reference numerals, and the same configurations and the same operations are not explained again.

Figure 22:
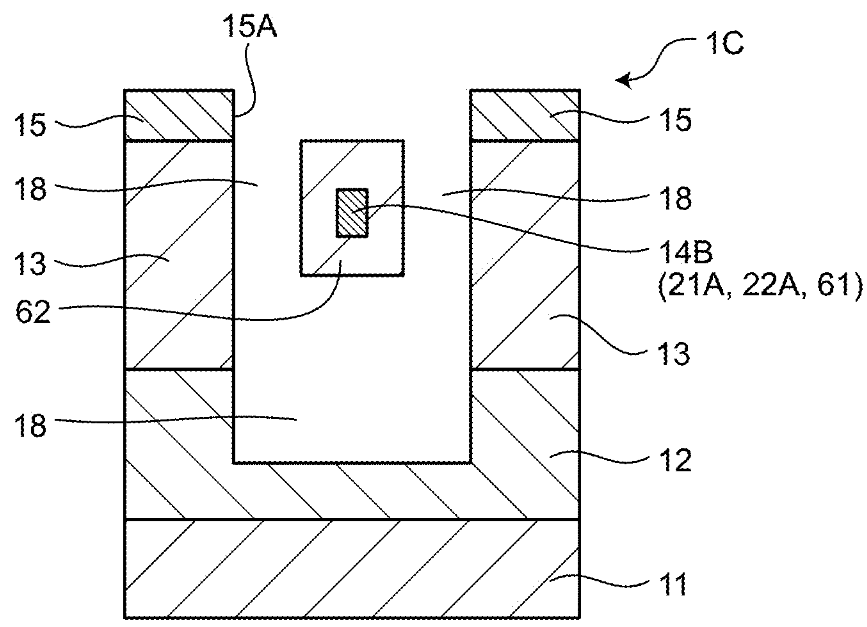
FIG. 22 is a substantially cross-sectional schematic view of an example of a substrate-type optical waveguide element according to a sixth embodiment.
Figure 23:
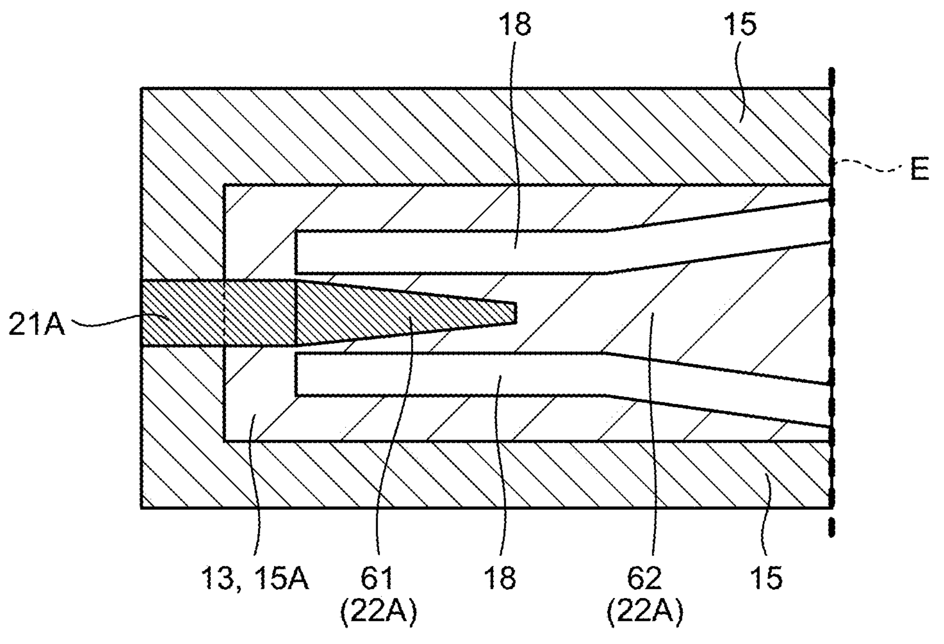
FIG. 23 is a planar schematic view illustrating an example of the substrate-type optical waveguide element according to the sixth embodiment.

FIG. 22 is a substantially cross-sectional schematic view of an example of a substrate-type optical waveguide element 1C according to the sixth embodiment. FIG. 23 is a planar schematic view illustrating an example of the substrate-type optical waveguide element 1C according to the sixth embodiment. The substrate-type optical waveguide element 1C having a hollow structure as illustrated in FIG. 22 includes the silicon (Si) substrate 11, the buried oxide (BOX) layer 12 that is laminated on the silicon (Si) substrate 11, and the cladding layer 13 that is made of silicon dioxide ($SiO_2$) and that is laminated on the buried oxide (BOX) layer 12. Moreover, the substrate-type optical waveguide element 1C includes an optical waveguide 14B that is surrounded by an air layer 18 till the cladding layer 13, and includes the passivation layer 15 that is laminated on the optical waveguide 14B and the cladding layer 13.

The optical waveguide 14B includes a linear waveguide 21A and an SSC 22A. The SSC 22A includes a first tapered waveguide 61 and a second tapered waveguide 62. The first tapered waveguide 61 is made of, for example, silicon nitride ($Si_3N_4$). Moreover, the first tapered waveguide 61 has a tapered structure in which the waveguide width gradually becomes narrower from the linear waveguide 21A toward the leading end. The second tapered waveguide 62 is made of, for example, silicon dioxide ($SiO_2$). Moreover, the second tapered waveguide 62 has a tapered structure in which the waveguide width gradually becomes wider from the first tapered waveguide 61 toward the substrate end face E. The SSC 22A performs conversion from the first tapered waveguide 61 into the second tapered waveguide 62 and widens the spot size of the light, and establishes a direct connection of an SMF having a normal diameter to the second tapered waveguide 62. The SSC 22A has a hollow structure in which the space between the buried oxide (BOX) layer 12 and the optical waveguide 14B serves as the air layer 18. Thus, due to the relative refractive index difference between the second tapered waveguide 62 and the air layer 18, the light is confined up to the leading end portion of the second tapered waveguide 62. Since there is only a small relative refractive index difference between the second tapered waveguide 62 and the air layer 18, it becomes possible to achieve the same modal diameter as in an optical fiber having the normal diameter.

The SSC 22A guides the light from the first tapered waveguide 61, which has a large relative refractive index difference, to the second tapered waveguide 62, which has a small relative refractive index difference, and thus widens the spot size of the light. The passivation layer 15 is formed in the region excluding at least some of the upper portion of the first tapered waveguide 61 and the second tapered waveguide 62. That is, the passivation layer 15 has the opening 15A formed in the upper portion of the first tapered waveguide 61 and the second tapered waveguide 62.

Figure 24A:
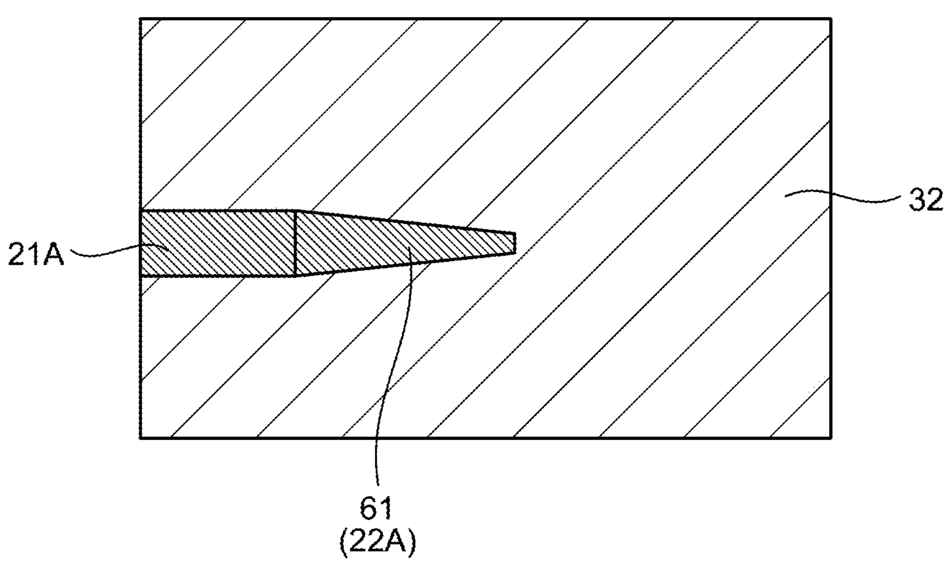
FIG. 24A is an explanatory diagram illustrating an example of a formation process of a first tapered waveguide on a silicon dioxide ($SiO_2$) layer in an SSC.

FIG. 24A is an explanatory diagram illustrating an example of a formation process of the first tapered waveguide 61 on a silicon dioxide ($SiO_2$) layer in the SSC 22A. On a silicon dioxide ($SiO_2$) layer, a silicon nitride ($Si_3N_4$) layer is deposited and etching is performed with respect to the silicon nitride ($Si_3N_4$) layer, so that the first tapered waveguide 61 including the linear waveguide 21A and the SSC 22A is formed on the silicon dioxide ($SiO_2$) layer. At the time of masking the silicon nitride ($Si_3N_4$) layer, the first tapered waveguide 61 is formed away from the substrate end face E. The distance from the substrate end face E is, for example, equal to 200 μm. Moreover, the plasma CVD method is implemented to form a silicon dioxide ($SiO_2$) layer and to form the cladding layer 13 by depositing a silicon dioxide ($SiO_2$) layer on the first tapered waveguide 61 and the linear waveguide 21A that are formed on the silicon dioxide ($SiO_2$) layer. Moreover, the plasma CVD method is implemented to form the passivation layer 15 on the cladding layer 13 by depositing a silicon nitride ($Si_3N_4$) layer on the cladding layer 13.

Figure 24B:
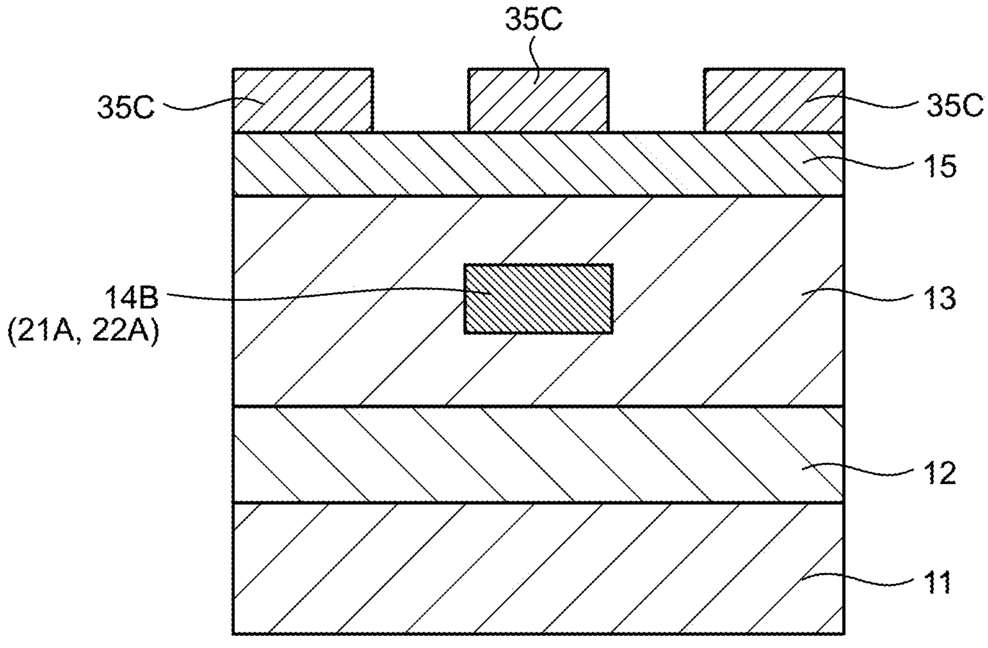
FIG. 24B is an explanatory diagram illustrating an example of a masking process.

FIG. 24B is an explanatory diagram illustrating an example of a masking process. In order to have a hollow structure for the first tapered waveguide 61 and the second tapered waveguide 62; photoresists 35C are disposed on the passivation layer 15 for the purpose of forming the pattern of the portion constituting the air layer 18 that is a hollow groove.

Figure 25:
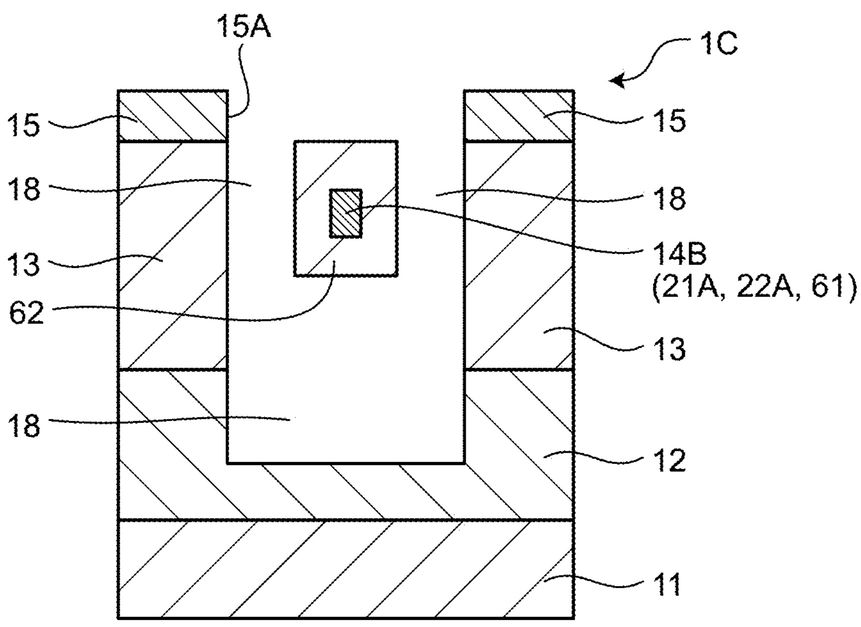
FIG. 25 is an explanatory diagram illustrating an example of a formation process of the SSC having a hollow structure.

FIG. 25 is an explanatory diagram illustrating an example of a formation process of the SSC 22A having a hollow structure. When dry etching is performed with respect to the passivation layer 15, the cladding layer 13, and the buried oxide (BOX) layer 12 with the photoresists 35C serving as the masks; the second tapered waveguide 62 is formed in the SSC 22A that has a hollow structure in which silicon dioxide ($SiO_2$) is surrounded by the air layer 18. Then, the passivation layer 15 is removed from the upper portion of the SSC 22A. That is, the passivation layer 15 is removed from the upper portion of the first tapered waveguide 61 and the second tapered waveguide 62 in the SSC 22A, and the openings 15A are formed. As a result, it becomes possible to obtain the substrate-type optical waveguide element 1C in which the SSC 22A has a hollow structure and the passivation layer 15 is removed from the upper portion of the SSC 22A.

In the substrate-type optical waveguide element 1C according to the sixth embodiment, the passivation layer 15 is formed in the region excluding the upper portion of the SSC 22A having a hollow structure. As a result, it becomes possible to reduce the light loss attributed to the transition of light from the core of the SSC 22A to the passivation layer 15, and to ensure long-term reliability attributed to the passivation layer 15.

Meanwhile, in the second tapered waveguide 62, silicon dioxide ($SiO_2$) is used as a semiconductor material or a dielectric substance. However, that is not the only possible case. Alternatively, silicon (Si), silicon mononitride (SiN), or silicon oxynitride (SiON) can also be used.

Figure 26:
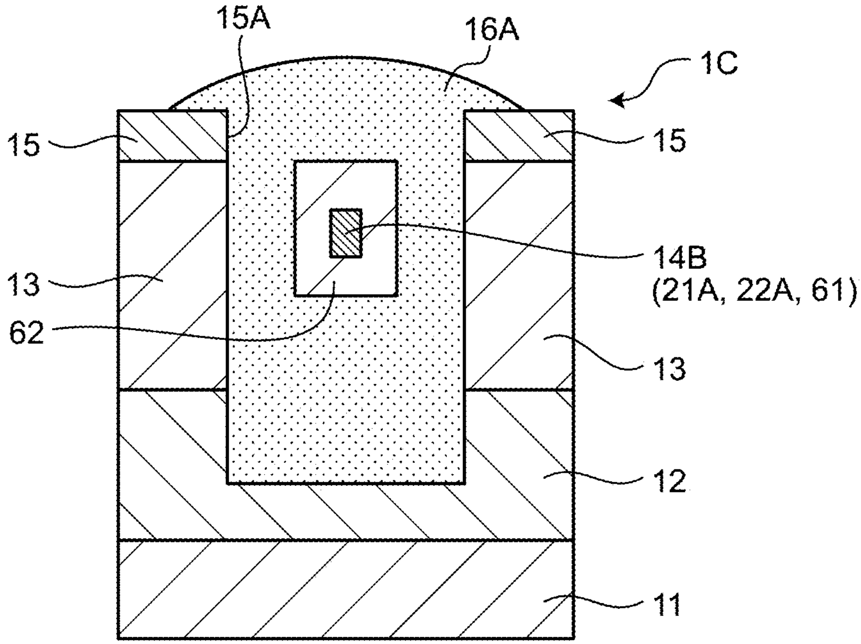
FIG. 26 is a substantially schematic view illustrating an example of the substrate-type optical waveguide element after an adhesive agent application process is performed.

FIG. 26 is a substantially schematic view illustrating an example of the substrate-type optical waveguide element 1C after the adhesive agent application process is performed. In the substrate-type optical waveguide element 1C according to the sixth embodiment, the SSC 22A is surrounded by the air layer 18. Alternatively, as illustrated in FIG. 26, a film having a lower material refractive index than the material refractive index of the optical waveguide 14B, such as an adhesive agent, can be injected into the air layer 18, and the surrounding of the optical waveguide 14B can be covered by a covering layer 16A.

Meanwhile, it is explained that the linear waveguide 21A, the SSC 22A, the first tapered waveguide 61, and the second tapered waveguide 62 have the structure of a channel waveguide. Alternatively, for example, it is possible to use a rib waveguide, a ridge waveguide, or a high-mesa waveguide. If the linear waveguide 21A, the SSC 22A, the first tapered waveguide 61, and the second tapered waveguide 62 have the structure of a rib waveguide, then the light seeps also in the slab portion of the rib waveguide. Hence, the impact of the sidewall roughness of the core is not significant, and it becomes possible to hold down the light loss. Meanwhile, as long as the cladding layer 13 has a lower material refractive index than the core, it is possible to use an arbitrary material in the cladding layer 13.

Figure 27:
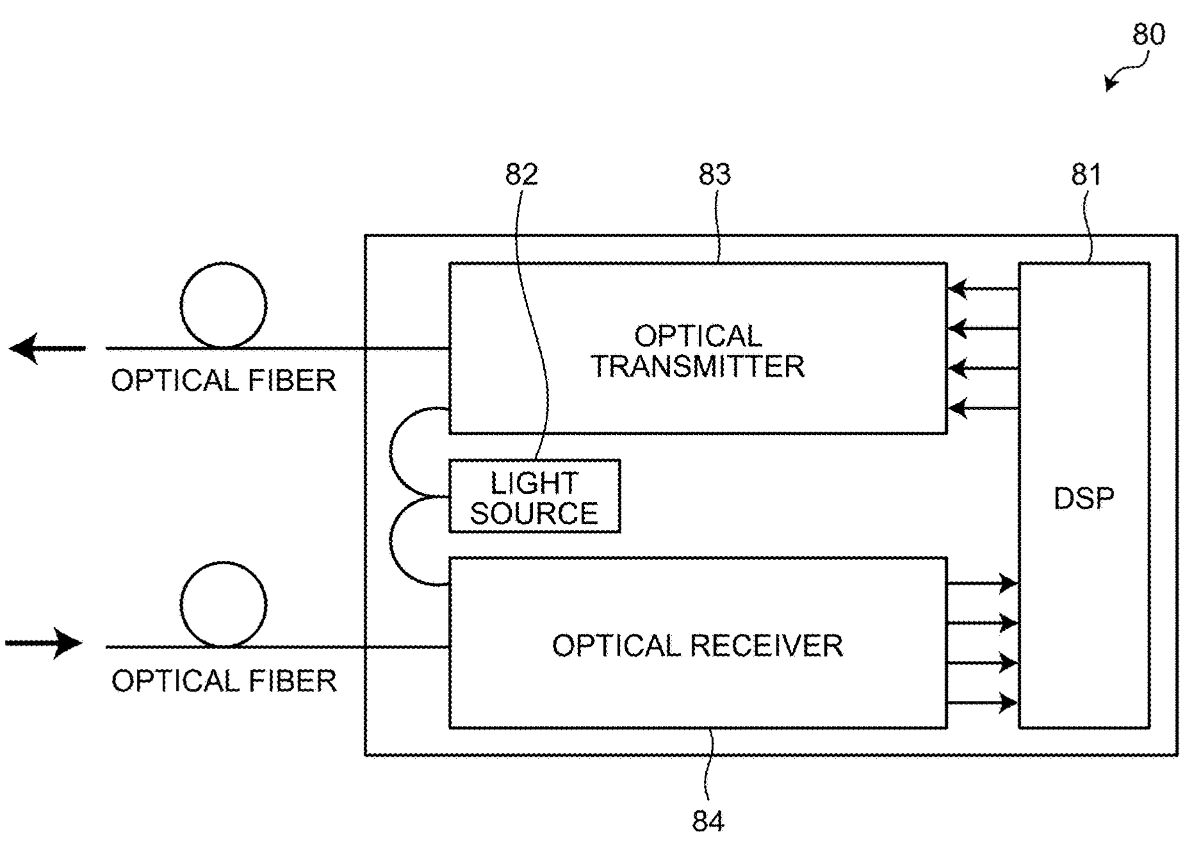
FIG. 27 is an explanatory diagram illustrating an example of an optical communication device that includes the substrate-type optical waveguide element according to the embodiments.
Figure 28:
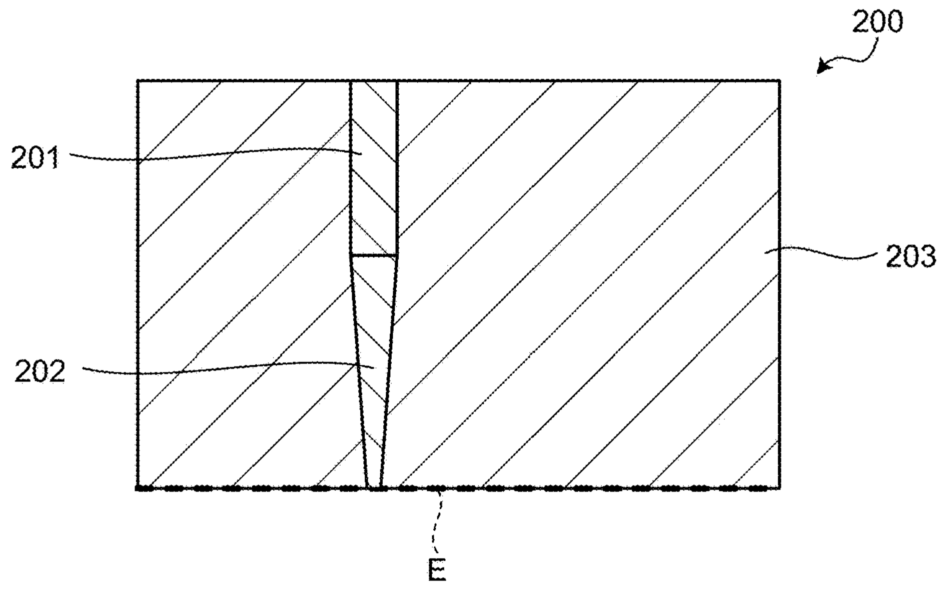
FIG. 28 is a planar schematic view of a substrate-type optical waveguide element that includes an inverse-tapered SSC structure.
Figure 29:
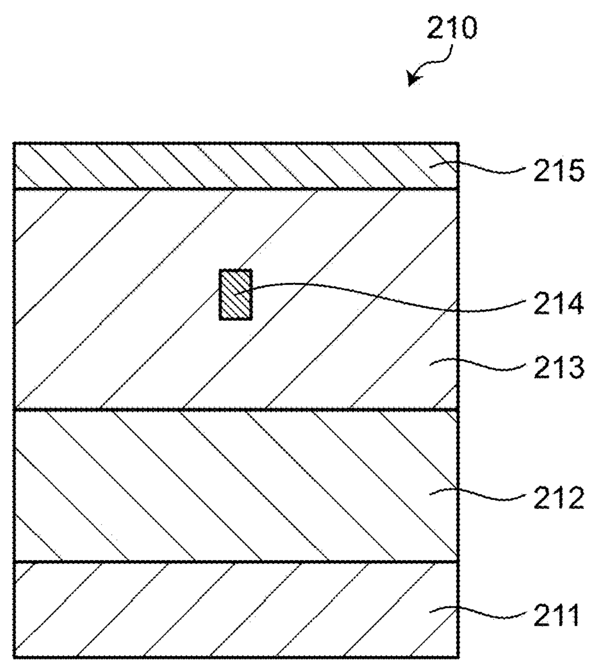
FIG. 29 is a substantially cross-sectional schematic view illustrating an example of a conventional substrate-type optical waveguide element.
Figure 30:
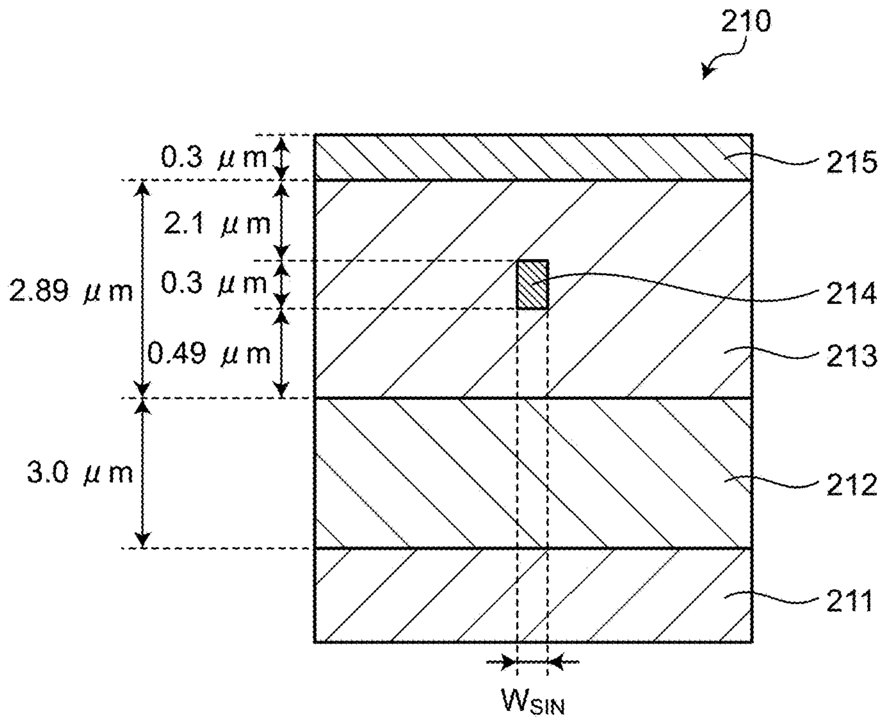
FIG. 30 is a substantially cross-sectional schematic view illustrating an example of a substrate-type optical waveguide element to be tested.
Figure 31:
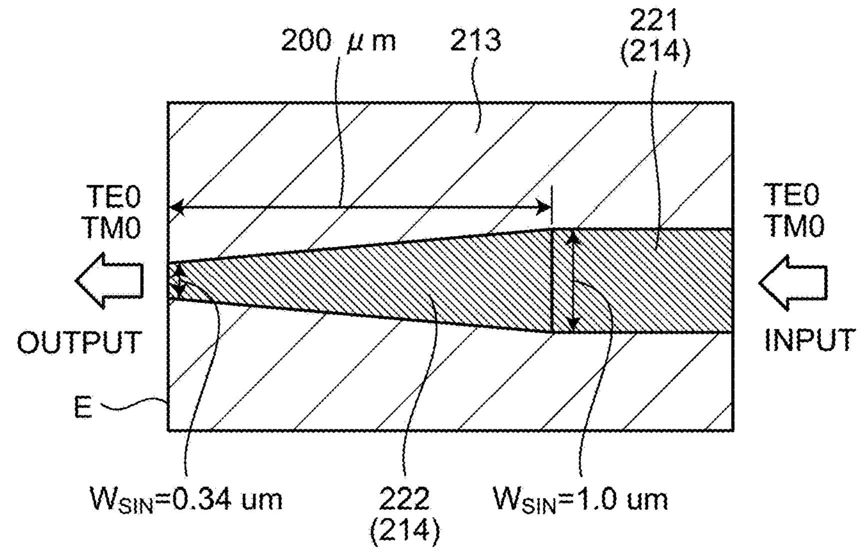
FIG. 31 is a planar schematic view illustrating an example of an SSC in the substrate-type optical waveguide element to be tested.
Figure 32:
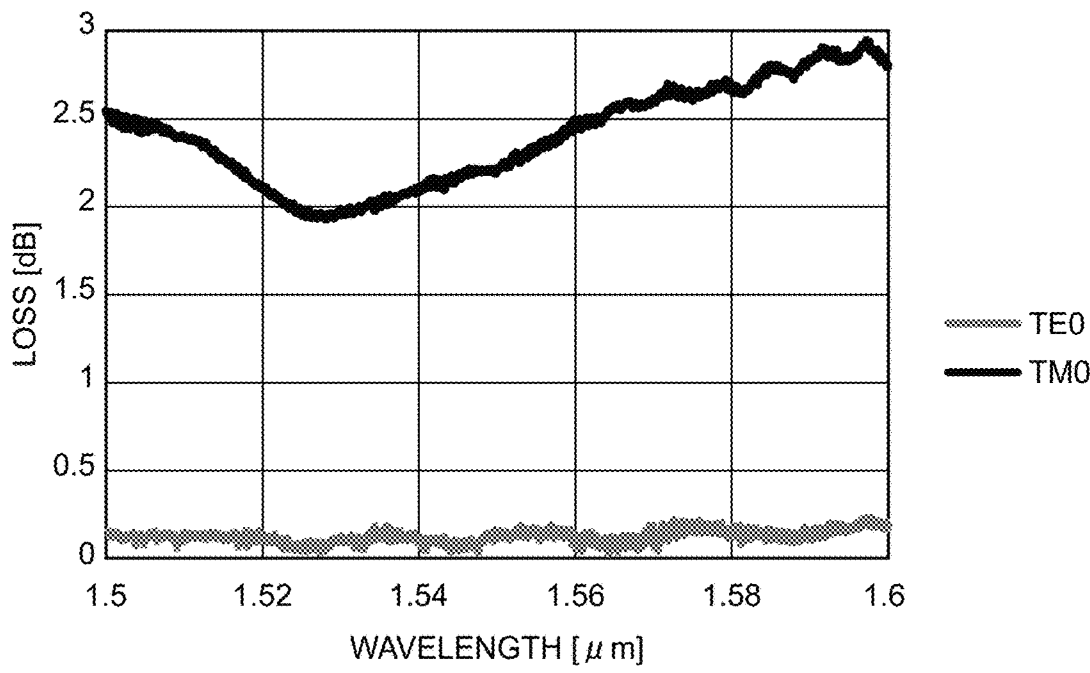
FIG. 32 is an explanatory diagram illustrating an example of the measurement result of the light loss for each input wavelength in the modes TE0 and TM0 of the SSC illustrated in FIG. 31.

FIG. 27 is an explanatory diagram illustrating an example of an optical communication device 80 that includes the substrate-type optical waveguide element 1 according to the embodiments. The optical communication device 80 is connected to an optical fiber on the output side and an optical fiber on the input side. The optical communication device 80 includes a digital signal processor (DSP) 81, a light source 82, an optical transmitter 83, and an optical receiver 84. The DSP 81 is an electrical component that performs digital signal processing. For example, the DSP 81 performs processing such as encoding of transmission data; generates electrical signals that include the transmission data; and outputs the electrical signals to the optical transmitter 83. Moreover, the DSP 81 obtains electrical signals, which include received data, from the optical receiver 84; performs processing such as decoding of the electrical signals; and obtains the received data.

The light source 82 is, for example, an integrated tunable laser assembly (ITLA) that includes a laser diode and that generates a light having a predetermined wavelength and supplies it to the optical transmitter 83 and the optical receiver 84. The optical transmitter 83 is an optical modulator that modulates the light, which is supplied from the light source 82, according to the electrical signals output from the DSP 81; and outputs the obtained transmission light to an optical fiber. When the light supplied from the light source 82 propagates through a waveguide, the optical transmitter 83 modulates that light according to the electrical signals input to the optical modulator, and generates the transmission light.

The optical receiver 84 receives optical signals from an optical fiber and, using the light supplied from the optical fiber, demodulates the received light. Then, the optical receiver 84 converts the post-demodulation received light into electrical signals and outputs them to the DSP 81. The optical transmitter 83 and the optical receiver 84 include the substrate-type optical waveguide element 1 that guides the light.

In the substrate-type optical waveguide element 1 in the optical communication device 80, for example, the passivation layer 15 is formed in the region excluding the upper portion of the SSC 22 made of silicon nitride ($Si_3N_4$). As a result, it becomes possible to reduce the light loss attributed to the transition of light from the core of the SSC 22 to the passivation layer 15, and to ensure long-term reliability attributed to the passivation layer 15.

Meanwhile, for explanatory convenience, the optical communication device 80 includes the optical transmitter 83 and the optical receiver 84. However, alternatively, only either the optical transmitter 83 or the optical receiver 84 can be included. For example, when only the optical transmitter 83 is included, the optical communication device 80 functions as an optical transmitter device. Similarly, when only the optical receiver 84 is included, the optical communication device 80 functions as an optical receiver device.

According to an aspect, it becomes possible to ensure the long-term reliability while achieving reduction in the light loss.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising a core formed on a substrate, a cladding layer covering the core, a passivation layer formed on the cladding layer, and a spot size converter that causes an increase in spot size of a light, which is guided through the core, toward end portion of the substrate, wherein the passivation layer includes an opening that exposes at least an upper portion of the cladding layer of the spot size converter so as to reduce a light loss attributed to a transition of light from the core of the spot size converter to the passivation layer, has a higher material refractive index than the cladding layer, and is formed in a region excluding the opening formed on at least an upper portion of the spot size converter, and on the cladding layer that is exposed from the opening formed on the passivation layer, the core of the spot size converter and a core of an optical fiber are optically coupled using an adhesive agent.

2. The optical device according to claim 1, wherein, in the spot size converter, width of the core becomes narrower toward end of the substrate so that spot size of the light becomes larger toward the end portion of the substrate.

3. The optical device according to claim 1, wherein, in the upper portion of the cladding layer, a film is formed that is made of a material having a lower material refractive index than the cladding layer.

4. The optical device according to claim 1, wherein material of the core includes at least one of silicon (Si), silicon mononitride (SiN), and silicon oxynitride (SiON).

5. The optical device according to claim 1, wherein the spot size converter and end portion of the substrate make an angle other than a right angle in the core.

6. The optical device according to claim 1, wherein two of the spot size converter are disposed with leading ends thereof in the core make a pair across a dicing line.

7. The optical device according to claim 1, wherein a plurality of the spot size converter is arranged.

8. The optical device according to claim 1, wherein the spot size converter includes a semiconductor or a dielectric substance as an optical waveguide whose surrounding is covered by a covering layer having a lower refractive index than the optical waveguide, and guides a light from an optical waveguide having a large relative refractive index difference to an optical waveguide having a small relative refractive index difference, and increases spot size of the light, and the passivation layer is formed in a region excluding at least some part of upper portion of the optical waveguide having a small relative refractive index difference.

9. The optical device according to claim 8, wherein material of a semiconductor or a dielectric substance constituting the optical waveguide includes at least one of silicon (Si), silicon dioxide ($SiO_2$), silicon mononitride (SiN), and silicon oxynitride (SiON).

10. The optical device according to claim 8, wherein the covering layer is an air layer.

11. An optical transmitter device comprising:

a processor that performs signal processing with respect to an electrical signal;

a light source that generates a light; and an optical transmitter that modulates the light, which is generated by the light source, using the electrical signal output from the processor, wherein an optical device installed in the optical transmitter device includes:

a core formed on a substrate, a cladding layer covering the core, a passivation layer formed on the cladding layer, and a spot size converter that causes an increase in spot size of a light, which is guided through the core, toward end portion of the substrate, and the passivation layer includes an opening that exposes at least an upper portion of the cladding layer of the spot size converter so as to reduce a light loss attributed to a transition of light from the core of the spot size converter to the passivation layer, has a higher material refractive index than the cladding layer, and is formed in a region excluding the opening formed on at least an upper portion of the spot size converter, and on the cladding layer that is exposed from the opening formed on the passivation layer, the core of the spot size converter and a core of an optical fiber are optically coupled using an adhesive agent.

12. An optical receiver device comprising:

a light source that generates a light; and an optical receiver that demodulates received light using the light coming from the light source, wherein an optical device installed in the optical receiver device includes:

a core formed on a substrate, a cladding layer covering the core, a passivation layer formed on the cladding layer, and a spot size converter that causes an increase in spot size of a light, which is guided through the core, toward end portion of the substrate, and the passivation layer includes an opening that exposes at least an upper portion of the cladding layer of the spot size converter so as to reduce a light loss attributed to a transition of light from the core of the spot size converter to the passivation layer, has a higher material refractive index than the cladding layer, and is formed in a region excluding the opening formed on at least an upper portion of the spot size converter, and on the cladding layer that is exposed from the opening formed on the passivation layer, the core of the spot size converter and a core of an optical fiber are optically coupled using an adhesive agent.

* * * * *